US007193961B2

(12) United States Patent
Suenaga et al.

(10) Patent No.: US 7,193,961 B2
(45) Date of Patent: Mar. 20, 2007

(54) OPTICAL INFORMATION-RECORDING MEDIUM AND METHOD FOR PRODUCING THE SAME

(75) Inventors: Masashi Suenaga, Moriya (JP);
Yusuke Takahashi, Moriya (JP);
Katsunori Miyata, Yuki-gun (JP);
Toyoyuki Nunomura, Tsukuba-gun (JP)

(73) Assignee: Hitachi Maxell, Ltd., Ibaraki (JP)

( * ) Notice: Subject to any disclaimer, the term of this patent is extended or adjusted under 35 U.S.C. 154(b) by 695 days.

(21) Appl. No.: 10/714,861

(22) Filed: Nov. 18, 2003

(65) Prior Publication Data
US 2004/0100895 A1 May 27, 2004

(30) Foreign Application Priority Data
Nov. 19, 2002 (JP) .............................. 2002-335034
Feb. 17, 2003 (JP) .............................. 2003-038919

(51) Int. Cl.
*G11B 7/24* (2006.01)
(52) U.S. Cl. ............................... 369/275.4; 369/275.3; 428/64.4
(58) Field of Classification Search ............. 369/275.1, 369/275.2, 275.3, 275.4, 275.5, 288, 286, 369/283, 13.54, 13.55, 277, 278, 279; 428/64.4, 428/64.5, 64.1
See application file for complete search history.

(56) References Cited

U.S. PATENT DOCUMENTS

| 5,940,364 | A | * | 8/1999 | Ogata et al. | ............. | 369/275.4 |
| 6,477,136 | B2 | | 11/2002 | Sakurai et al. | | |
| 6,982,944 | B2 | * | 1/2006 | Suenaga et al. | ......... | 369/275.4 |

FOREIGN PATENT DOCUMENTS

| JP | A 63-153743 | 6/1988 |
| JP | A 9-326138 | 12/1997 |
| JP | A 2001-67733 | 3/2001 |
| JP | A 2001-118288 | 4/2001 |

* cited by examiner

*Primary Examiner*—Ali Neyzari
(74) *Attorney, Agent, or Firm*—Oliff & Berridge, PLC

(57) ABSTRACT

An optical information-recording medium has a plurality of lands and grooves formed on a substrate. In-groove pits are formed at the bottom of a part of the grooves. The widths of the in-groove pits in the radial direction of the substrate are suppressed from being widened irrelevant to the lengths in the groove direction. Predetermined shapes of the land and the groove are maintained for the shape of the land disposed adjacently to the in-groove pit without greatly eroding or scraping the side wall. A recording signal obtained from land prepits can be reliably detected on the optical information-recording medium manufactured by using the substrate formed with the land prepits disposed adjacently to the in-groove pits.

15 Claims, 27 Drawing Sheets

FIG. 14
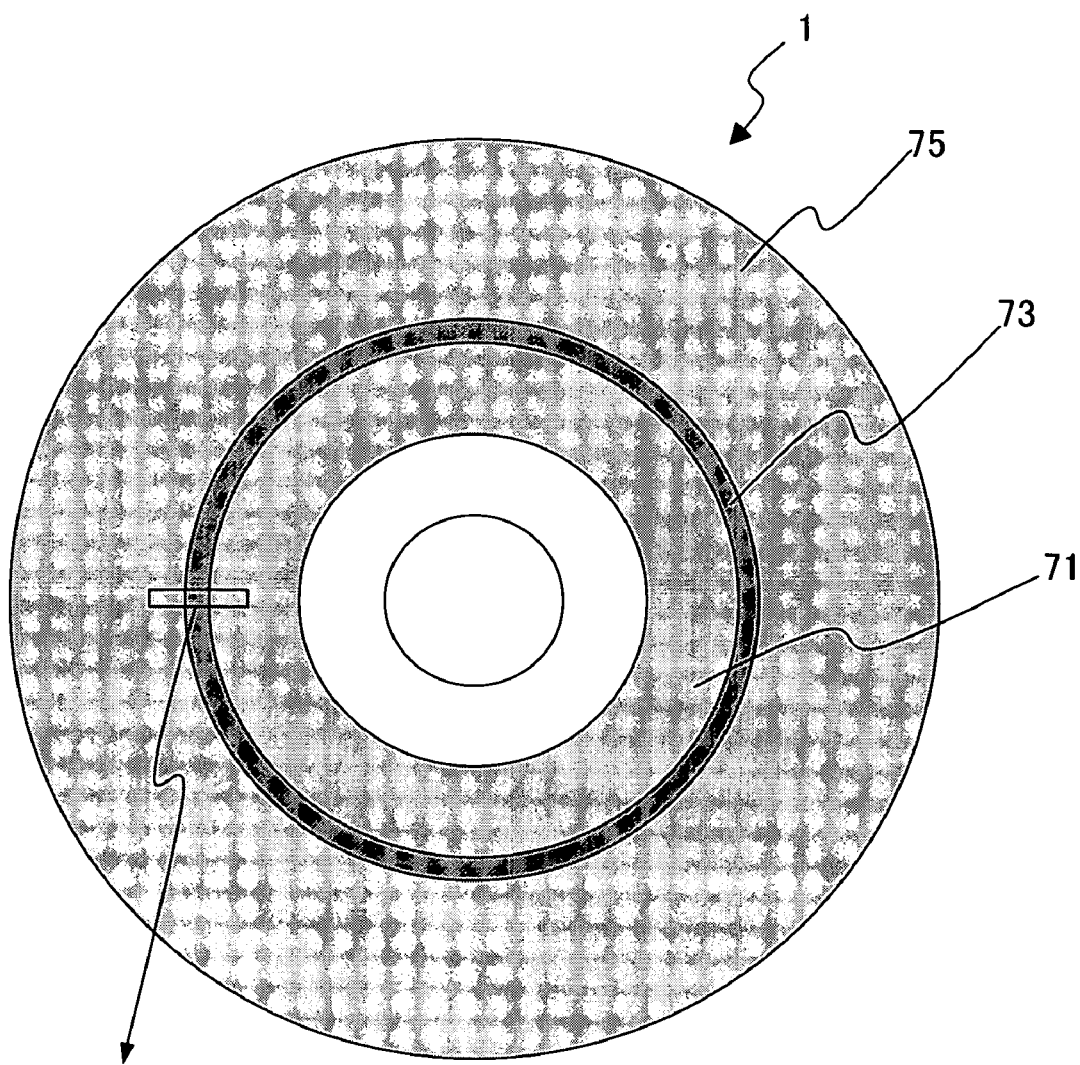
MAGNIFIED VIEW
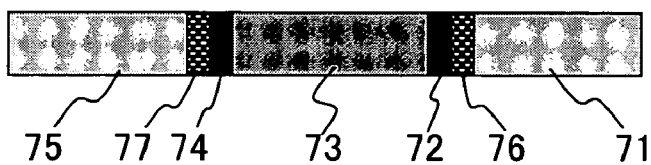
75  77 74   73   72 76   71

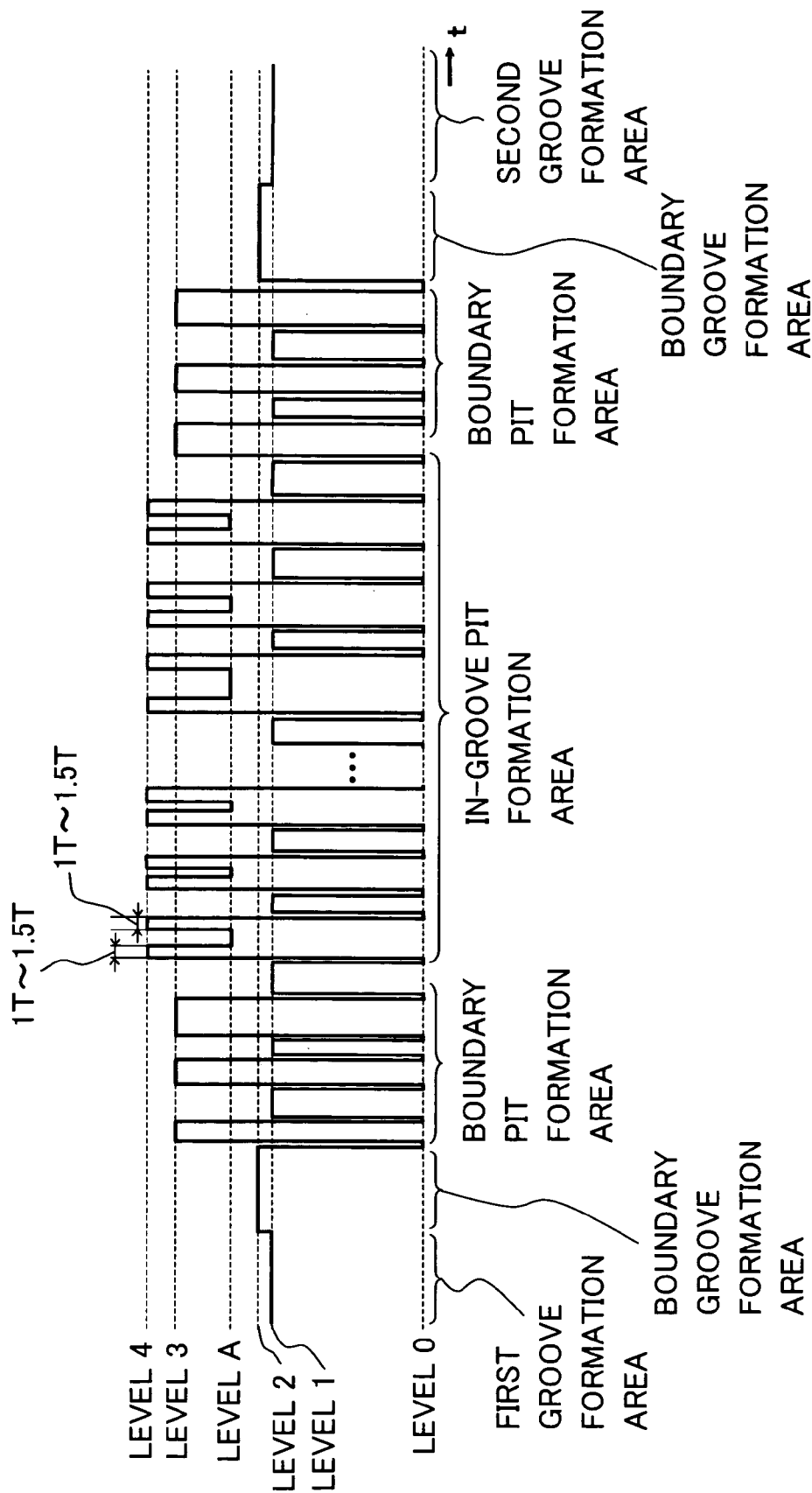

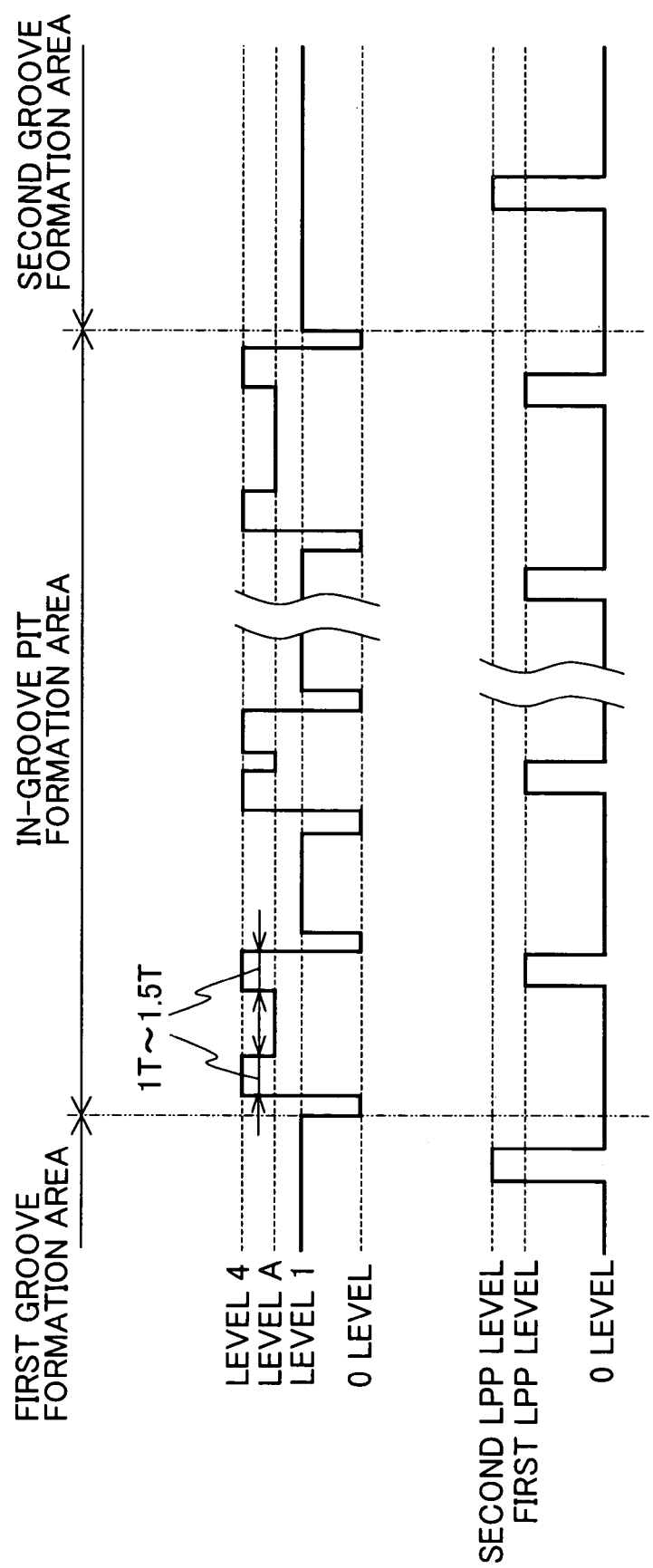

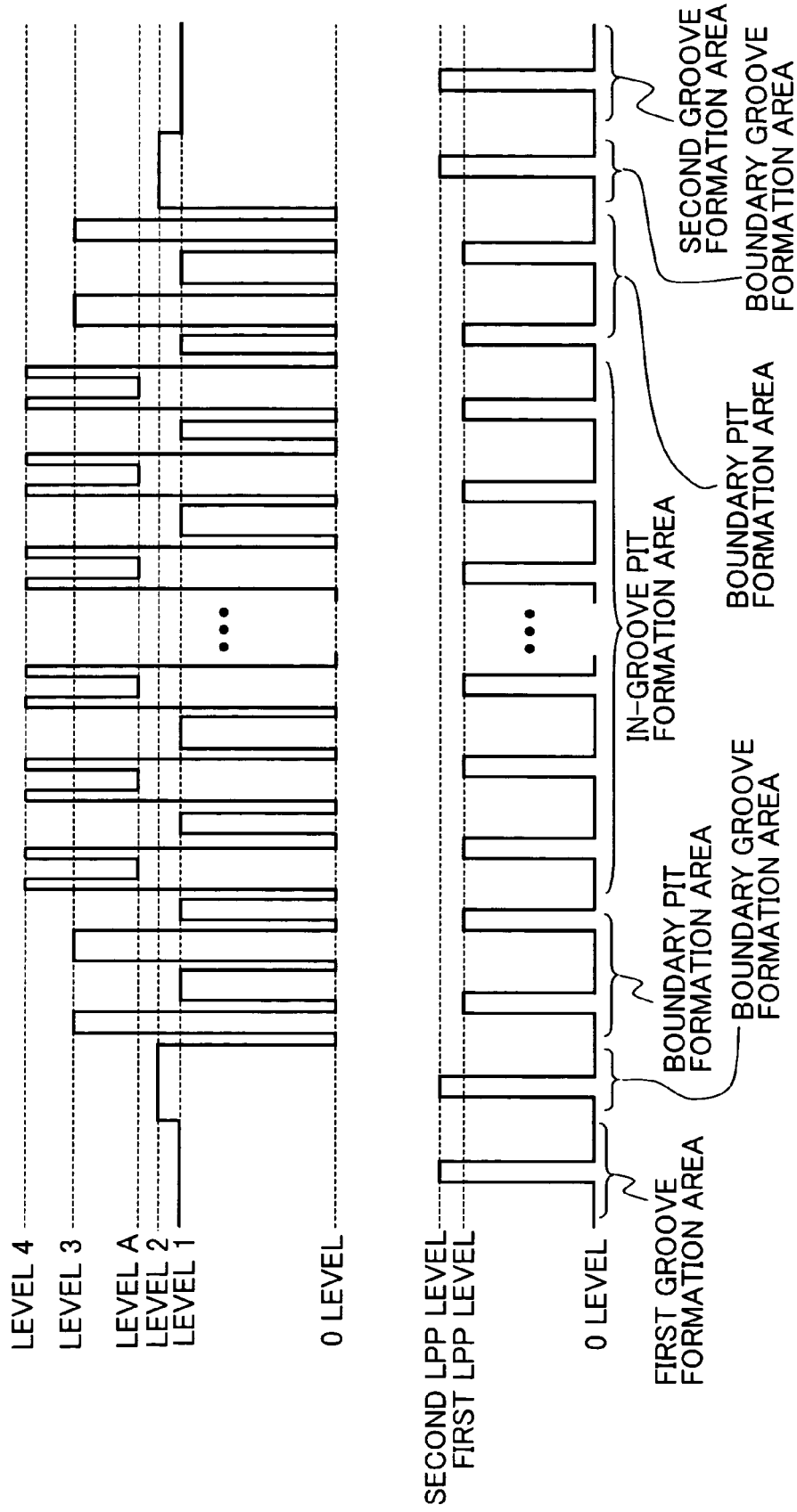

OPTICAL INFORMATION-RECORDING MEDIUM AND METHOD FOR PRODUCING THE SAME

BACKGROUND OF THE INVENTION

1. Field of the Invention

The present invention relates to an optical information-recording medium. In particular, the present invention relates to an optical information-recording medium on which media information including, for example, the name of the manufacturer and the information concerning copyright protection measures is written in a form of prepits.

2. Description of the Related Art

In recent years, DVD (digital versatile disk), which has a recording capacity several times that of CD (compact disk), is widely used as an information-recording medium on which information including, for example, voices and images and so on is recorded. In addition to DVD, those having been already available as commercial products include DVD-R (write-once type digital versatile disk) on which information can be recorded by a user only once, and DVD-RW (rewritable type digital versatile disk) on which information is rewritable. Widespread use of them is considered to become universal as information-recording media having large capacities in future.

Usually, in the case of DVD-R and DVD-RW, the information (hereinafter referred to as "media information"), which includes, for example, the information on the disk manufacturer and the information on the copyright protection measures, is previously recorded on the innermost circumferential portion or the outermost circumferential portion of the disk. The media information is recorded at the final stage of the disk production steps such that the recording layer is modified, for example, by radiating a light beam by using a recording apparatus. On the other hand, a method is disclosed (see, for example, Japanese Patent Application Laid-open No. 2001-67733, pages 5 to 6, FIGS. 1 to 3), in which the media information is not recorded in the recording layer unlike the above, but the media information is previously recorded in a form of emboss pits (hereinafter referred to as "in-groove pits") on the groove of the substrate at the stage of the production of the substrate of the disk. A part of an optical information-recording medium manufactured by using this method is shown in FIG. 1. FIG. 1A shows a partial magnified plan view illustrating the optical information-recording medium, which schematically depicts an area (hereinafter referred to as "in-groove pit area") in which in-groove pits are formed.

FIGS. 1B and 1C show a sectional view taken along a line 1B—1B and a sectional view taken along a line 1C—1C shown in FIG. 1A respectively. As shown in FIG. 1B, the optical information-recording medium is formed such that the depth dp", which ranges to the bottom surface (lowermost surface) 107a of the in-groove pit 107 on the basis of the land surface 101a of the substrate 101 formed with the land and the groove, is deeper than the depth dg" which ranges to the bottom surface (lowermost surface) 105a of the groove 105 on the basis of the land surface 101a as well. Accordingly, when a recording layer 102 and a reflective layer 103 are formed on the pattern formation surface of the substrate 101, the difference in the surface height of each of layers to be formed appears between the portion at which the in-groove pit 107 is formed and the portion of the groove at which the in-groove pit 107 is not formed. Therefore, it is possible to record the data such as the media information on the groove by utilizing the difference in depth between the in-groove pit portion and the groove portion.

In the case of the substrates for the DVD-R and DVD-RW, pits (hereinafter referred to as "land prepits") are provided on the land formed between the grooves, on which, for example, the address information of the disk is recorded (see, for example, Japanese Patent Application Laid-open Nos. 09-326138 (pages 1 to 8, FIGS. 3 and 15) and 2001-118288 (pages 1 to 8, FIG. 1)). Further, a method is known (see, for example, Japanese Patent Application Laid-open No. 63-153743 (page 278, pages 280 to 282, FIG. 3)), in which the exposure intensity is switched during the process in which the exposure is performed with a pattern corresponding to one pit in the exposure step for a master disk to produce a substrate provided with pits.

In the case of the optical information-recording medium provided with the in-groove pits, as shown in FIG. 1, the in-groove pit is formed such that the width (length in the radial direction of the disk) of those disposed in the vicinity of the middle portion in the track direction (hereinafter abbreviated as "middle portion") is wider than that of the end in the track direction (i.e., in the groove direction), probably for the following reason. That is, it is considered that the wide width is generated by the increased totalized exposure amount of the laser beam to be radiated at the middle portion of the pattern when the exposure is performed in order to form the pattern corresponding to the in-groove pit on the master disk. Accordingly, the width of the middle portion of the in-groove pit is widened as compared with the width of the groove, and the side wall of the adjoining land is eroded. That is, the width of the land disposed adjacently to the in-groove pit is narrowed. In particular, when the land prepit is formed on the land disposed adjacently to the in-groove pit, it has been hitherto impossible to sufficiently secure the width of the land surface between the in-groove pit and the land prepit. As a result, as shown in FIG. 11B, the following problems have arisen. That is, the jitter of the detection signal of the land prepit is increased, the aperture ratio (AR) does not satisfy the predetermined requested value, and the error rate is increased.

As far as the present inventors know, there has been no instance in which the exposure intensity is controlled for an in-groove pit formation pattern during the exposure for a master disk in order to control the shape of the in-groove pit which is formed to be deeper than the groove.

SUMMARY OF THE INVENTION

Accordingly, an object of the present invention is to provide an optical information-recording medium in which the reproduction error rate can be reduced by reliably detecting a signal from pits on the optical information-recording medium having a substrate on which in-groove pits are formed, and a method for producing the same.

According to a first aspect of the present invention, there is provided an optical information-recording medium comprising a circular substrate which is formed with a plurality of lands and grooves and a recording layer and a reflective layer which are provided on the circular substrate; wherein a first pit, and a second pit which has a length in a groove direction longer than that of the first pit are formed on a bottom of the groove; and $1<W_2/W_1<1.2$ is satisfied provided that $W_1$ represents a maximum width of the first pit in a radial direction of the substrate, and $W_2$ represents a maximum width of the second pit in the radial direction of the substrate.

The plurality of lands and grooves are formed on the substrate of the optical information-recording medium of the present invention. Pits (in-groove pits) are formed at the bottom of a part of the grooves. The width of the in-groove pit in the radial direction of the substrate is suppressed from being widened irrelevant to the length of the in-groove pit in the groove direction. The side wall is not greatly eroded or scraped in relation to the shape of the land disposed adjacently to the in-groove pit as well, and certain shapes of the land and the groove are maintained.

In this arrangement, the first pit and the second pit have arbitrary lengths which are determined on the basis of the unit of the length determined by the data to be modulated. For example, in the case of the EFM modulation adopted for the DVD standard, the pits have lengths within a range of 3T to 14T.

In the present invention, a groove, in which no pits are formed, may be further formed on the circular substrate. When the groove, in which no pits are formed, is further formed on the circular substrate, a land prepit may be formed on the land defined between the grooves. In this arrangement, it is desirable that $0.3 \leq d_{lg}/d_g \leq 0.7$ is satisfied provided that the land height from the groove bottom surface, which is the same as the groove depth from the land surface, is represented by $d_g$, and $d_{lg}$ represents a height of a side wall of the land prepit measured from the bottom surface of the groove.

According to a second embodiment of the present invention, there is provided an optical information-recording medium comprising a circular substrate which is formed with a plurality of lands and grooves and a recording layer and a reflective layer which are provided on the circular substrate; wherein a first pit, and a second pit which has a length in a track direction longer than that of the first pit are formed on a bottom of the groove; a third pit is formed on the land between the grooves in which the first and second pits are formed; and $0.4 \leq d_{lp}/d_g < 1$ is satisfied provided that $d_{lp}$ represents a height of a side wall of the third pit measured from a bottom surface of the groove, and $d_g$ represents a depth of the groove.

When the prepit (land prepit) is formed on the land defined between the grooves having no in-groove pit (grooves equipped with no pit), the totalized exposure amount of the light radiated onto the area disposed between the groove equipped with no pit and the land prepit is smaller than the totalized exposure amount of the light radiated onto the area between the pit-equipped groove and the land prepit, for the following reason. That is, the exposure light beam, which is in an amount smaller than that for the pit-equipped groove, is sufficient for the groove equipped with no pit. Therefore, the land portion (hereinafter designated as the side wall of the land prepit), which is defined between the groove equipped with no pit and the land prepit, is eroded to a smaller extent as compared with the land portion which is defined between the pit-equipped groove and the land prepit. It is possible to secure a relatively large land surface. However, according to the studies performed by the present inventors, it has been revealed that the number of reproduction errors is increased when the land prepit is formed between the two grooves equipped with no pit. As a result of the analysis performed by the present inventors for the condition for forming the groove and the land prepit by means of experiments, it has been revealed that the number of reproduction errors is suddenly increased unless the condition of $0.3 \leq d_{lg}/d_g \leq 0.7$ is satisfied by the depth of the groove equipped with no pit (height from the groove bottom surface to the land surface) $d_g$ and the height of the side wall $d_{lg}$ of the land prepit of the land interposed between the grooves equipped with no pit as shown in FIG. 12A. In order to form the shape of the substrate which satisfies this condition, it is necessary to strictly regulate the totalized exposure amount of those of the light for performing the exposure for the pattern of the grooves equipped with no pit and the light for performing the exposure for the land prepits.

The present inventors have also investigated, from various viewpoints, the formation condition of the in-groove pit and the land prepit in order to reliably detect the recording signal on the land prepits for a case in which the pits (land prepits) are formed on the land interposed between the pit-equipped grooves. As a result, as shown in FIG. 12B, it has been revealed that the error of the reproduced signal can be suppressed to be extremely low by satisfying $0.4 \leq d_{lp}/d_g < 1$ by the height $d_{lp}$ of the height of the side wall of the land prepit from the bottom surface of the pit-equipped groove and the groove depth (height from the groove bottom surface to the (non-eroded) land surface) $d_g$.

In the present invention, the recording layer may be formed of a dye material. Further, the dye material may be an azo dye material.

According to a third aspect of the present invention, there is provided a method for producing the optical information-recording medium as defined in the first aspect, comprising:

exposing a photosensitive material with a pattern corresponding to at least the second pit by exposing the photosensitive material formed on a master disk while modulating an exposure intensity between a first exposure intensity and a second exposure intensity which is lower than the first exposure intensity, and exposing the photosensitive material with a pattern corresponding to the groove by exposing the photosensitive material at a third exposure intensity which is lower than the second exposure intensity;

developing the master disk after the exposure to form a pattern corresponding to the first pit, the second pit, and the groove;

forming the substrate by using the master disk on which the pattern has been formed; and forming the recording layer and the reflective layer on the substrate.

The optical information-recording medium according to the present invention can be produced by using the method according to the present invention.

The method for producing the optical information-recording medium according to the present invention may comprise exposing the photosensitive material with a pattern corresponding to the first pit by exposing the photosensitive material at the first exposure intensity. The exposure intensity for the pattern corresponding to the second pit, may be firstly the first exposure intensity, may be changed to the second exposure intensity thereafter, and may be further changed to the first exposure intensity. Further, the method for producing the optical information-recording medium according to the present invention may comprise allowing the exposure intensity to be zero before and after the exposure with the patterns corresponding to the first and second pits. The method for producing the optical information-recording medium according to the present invention may comprise etching by RIE during the development.

BRIEF DESCRIPTION OF THE DRAWINGS

FIG. 14 schematically shows areas of a substrate of an optical information-recording medium obtained in the second embodiment.

FIG. 15 shows the time-dependent change of the exposure intensity of the laser beam to be radiated onto the glass master disk formed in the second embodiment.

FIG. 20 shows the time-dependent change of the exposure intensity of the laser beam to be radiated onto the glass master disk in a third embodiment.

FIG. 22 shows the time-dependent change of the exposure intensity of a laser beam to be radiated onto the glass master disk in the fourth embodiment.

DESCRIPTION OF THE PREFERRED EMBODIMENTS

An embodiment of the present invention will be explained with reference to the drawings. However, the present invention is not limited thereto.

First Embodiment

Method for Manufacturing Master Disk and Stamper for Manufacturing Substrate

Figure 1A:
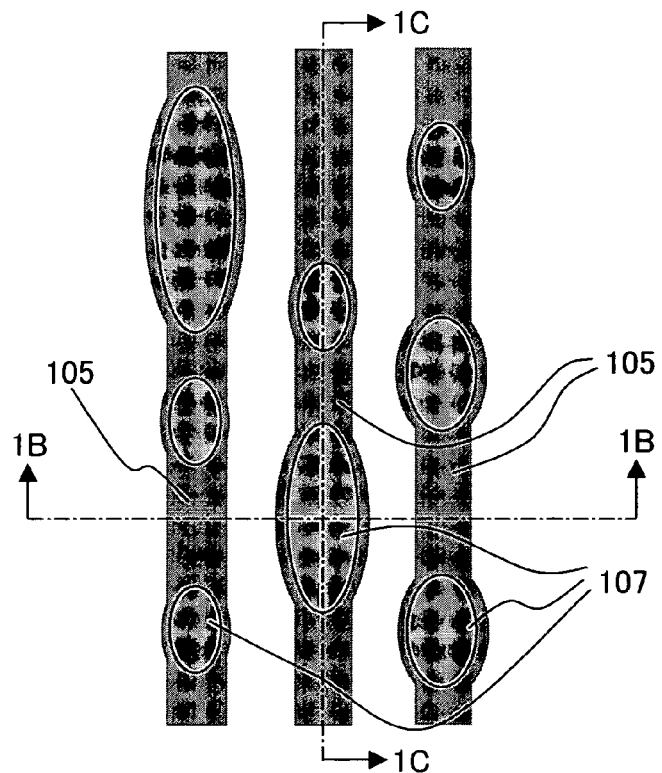
FIG. 1A shows a schematic top view illustrating a part of an optical information-recording medium having conventional in-groove pits.
Figure 1B:
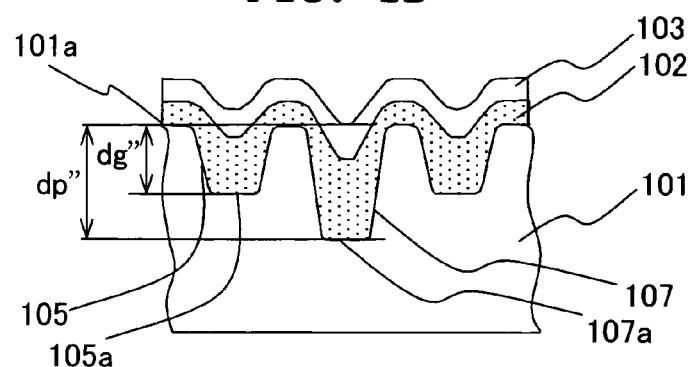
FIG. 1B shows a sectional view taken along a line 1B—1B shown in FIG. 1A.
Figure 1C:
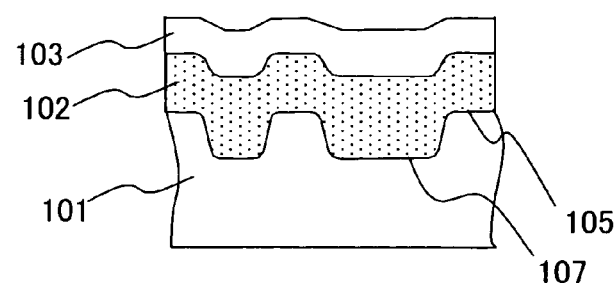
FIG. 1C shows a sectional view taken along a line 1C—1C shown in FIG. 1A.
Figure 2A:
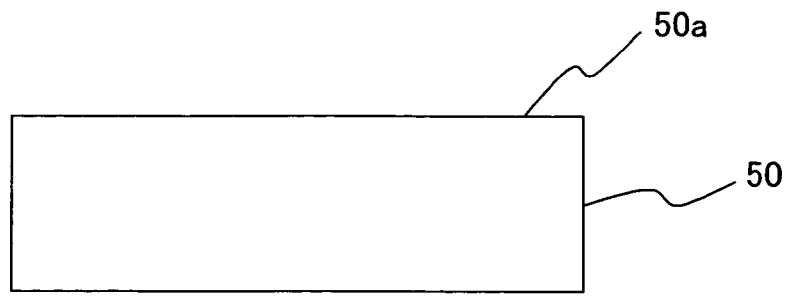
FIGS. 2A to 2C illustrate a process for manufacturing a glass master disk in a first embodiment.
Figure 2B:
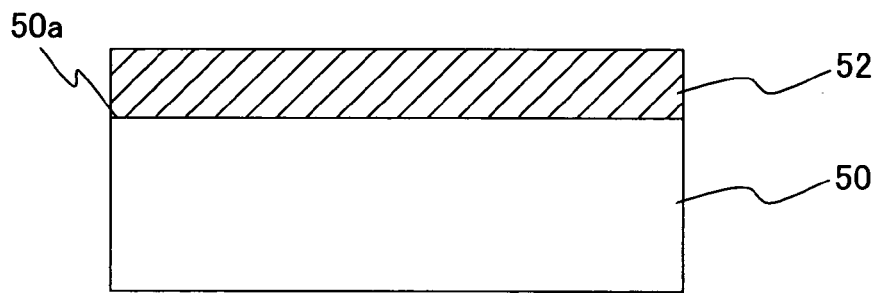
Figure 2C:
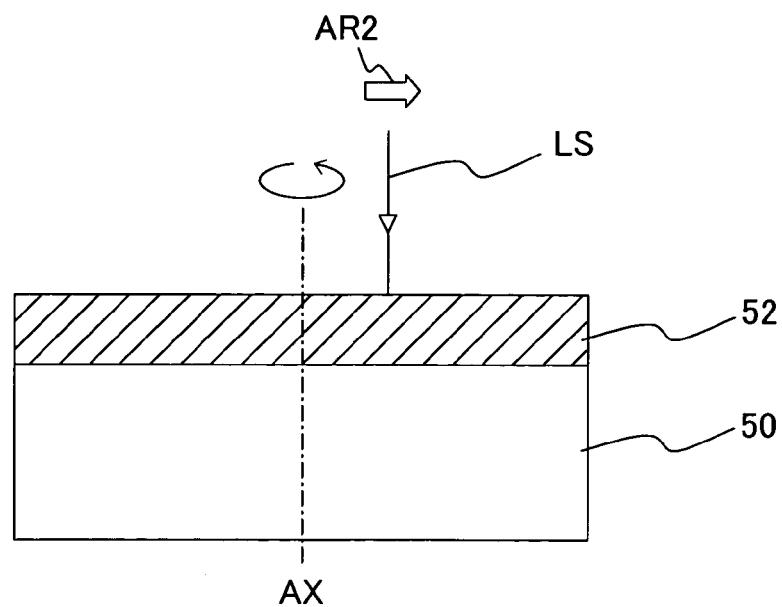
Figure 8:
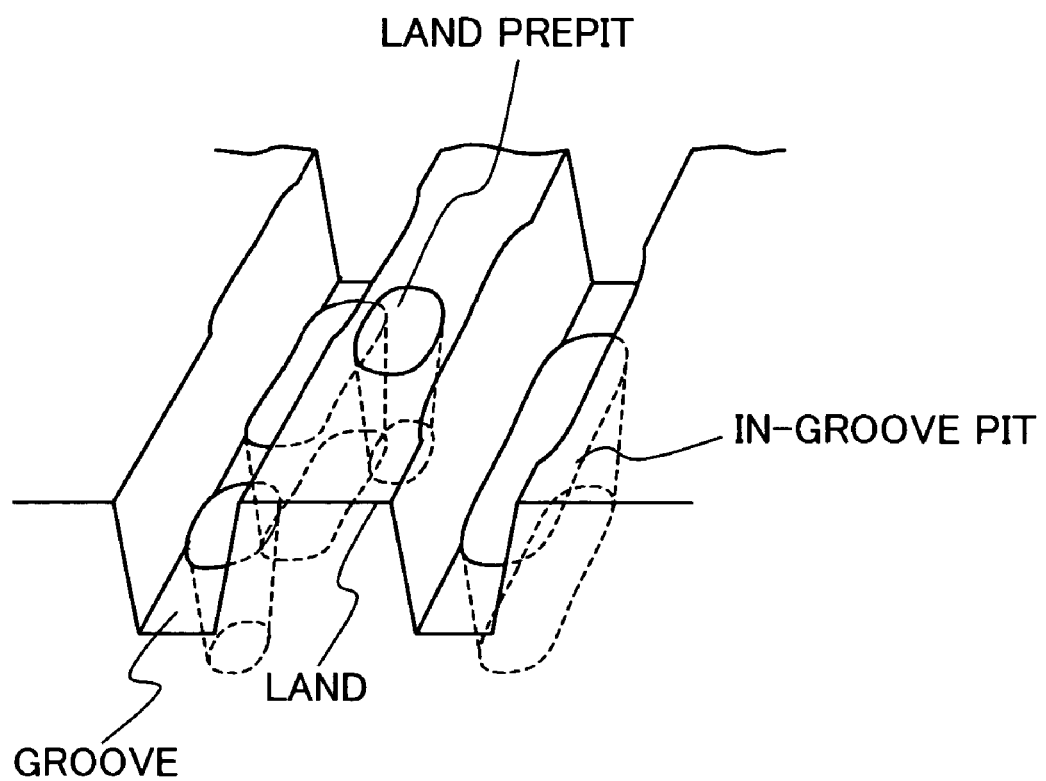
FIG. 8 shows a schematic perspective view illustrating a pattern formation surface of a substrate obtained in the first embodiment.
Figure 9:
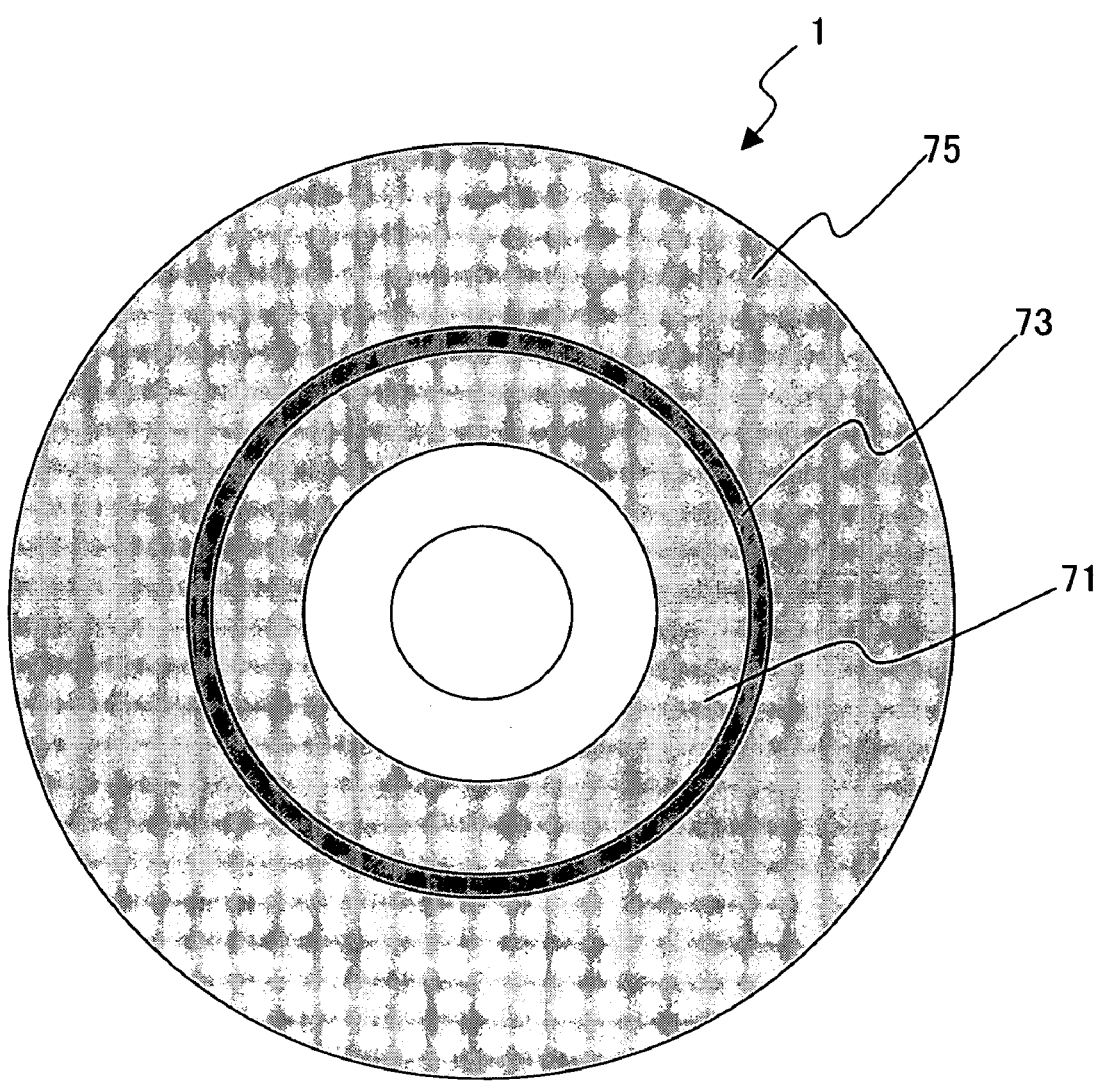
FIG. 9 schematically shows the substrate obtained in the first embodiment.

As shown in FIG. 9, a substrate 1 of an information-recording medium according to the present invention is comparted into a groove area 71, an in-groove pit area 73, and a groove area 75 which are formed in this order from the inner circumferential side of the substrate 1. An explanation will be made with reference to FIGS. 2 to 6 and 8 to 10 about a method for manufacturing a master disk and a stamper for manufacturing the substrate 1. As shown in FIG. 2A, a glass master disk 50 having a diameter of 200 mm and a thickness of 6 mm was prepared. Subsequently, as shown in FIG. 2B, a photoresist 52 was uniformly applied to have a thickness of 200 nm on one surface 50*a* of the glass master disk 50 by using the spin coat method. Subsequently, the glass master disk 50, on which the photoresist 52 had been formed, was installed to an unillustrated cutting apparatus. The cutting apparatus (master disk exposure apparatus) principally comprises, for example, a Kr gas laser light source which oscillates a laser beam having a wavelength of 351 nm, an optical modulator which is composed of an acousto-optical modulator element, a light-collecting lens, and a drive unit which rotates the glass master disk. As shown in FIG. 2C, the laser beam LS, which is emitted from the laser light source of the cutting apparatus, is radiated onto the photoresist 52 on the glass master disk 50 via the optical modulator and the light-collecting lens. In this procedure, the glass master disk 50 was rotated at a predetermined number of revolutions about the central axis AX of the glass master disk 50. The laser beam LS was moved so that the radiation position of the laser beam LS on the glass master disk 50 was moved from the inner side to the outer side of the glass master disk 50 in the radial direction of the glass master disk 50 (arrow AR2).

Figure 3:
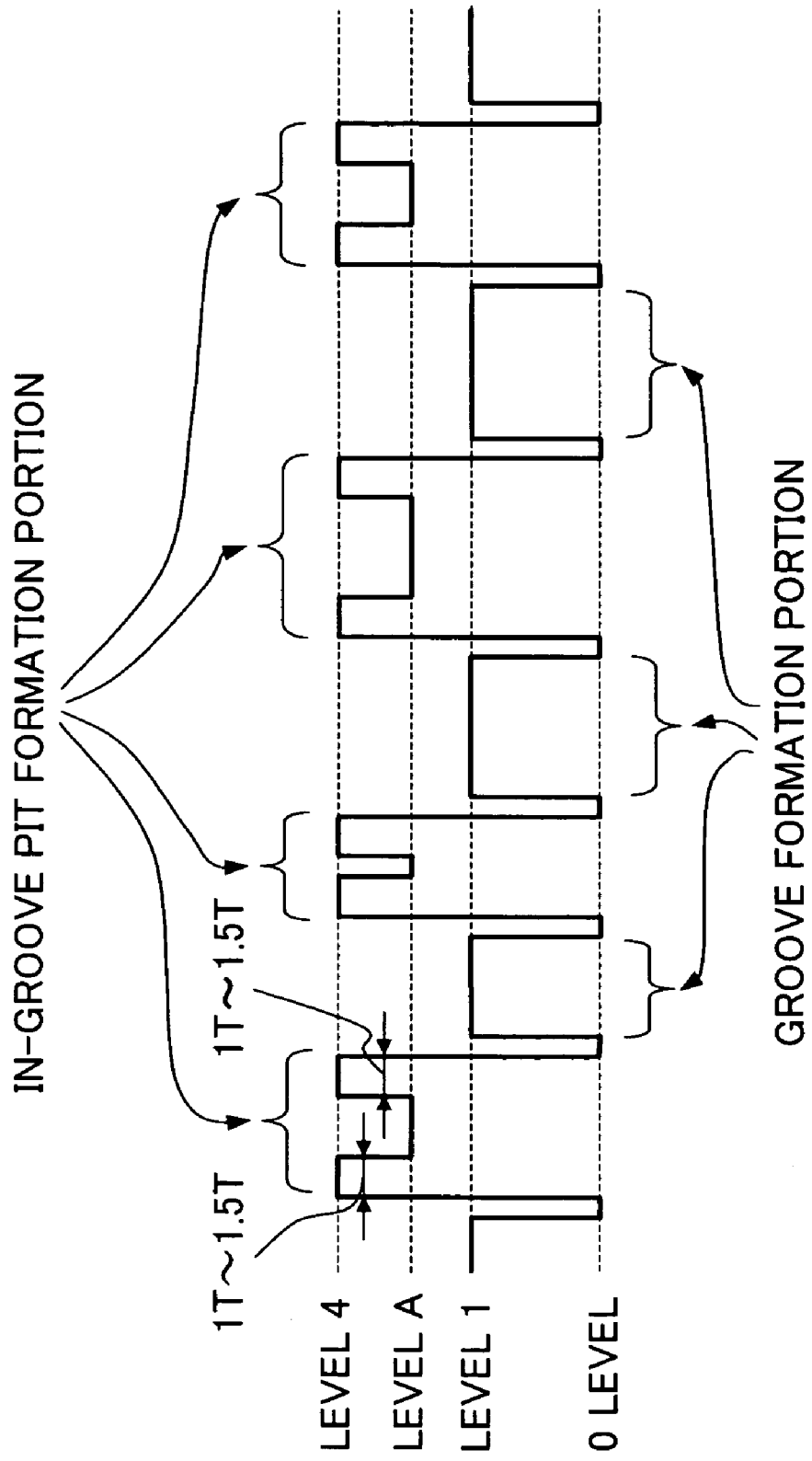
FIG. 3 shows the time-dependent change of the exposure intensity of a laser beam to be radiated onto the glass master disk in the first embodiment.

The exposure intensity of the laser beam LS to be radiated onto the glass master disk 50 is changed with the optical modulator while moving the laser beam LS as described above. An area, which has radiuses of 19 mm to 24.0 mm from the central axis (AX) of the glass master disk 50, corresponds to the groove area 71 of the substrate 1 shown in FIG. 9 (hereinafter referred to as "first groove formation area"). An area, which has radiuses of 24.0 mm to 24.1 mm, corresponds to the in-groove pit area 73 of the substrate 1 (hereinafter referred to as "in-groove pit formation area"). An area, which has radiuses of 24.1 mm to 58.9 mm, is a user data area which corresponds to the groove area 75 of the substrate 1 (hereinafter referred to as "second groove formation area"). In this embodiment, the exposure intensity was set to the low level (hereinafter referred to as "level 1") for the first and second groove formation areas. In the in-groove pit formation area, as shown in FIG. 3, the exposure intensity of the laser beam was changed at three levels, i.e., the low level, the middle level, and the high level. The exposure intensity, which was adopted when the portion corresponding to the in-groove pits (hereinafter referred to as "in-groove pit formation portion") in the in-groove pit formation portion, was set to two levels of the high level (hereinafter referred to as "level 4") and the middle level (hereinafter referred to as "level A"), and the exposure intensity was set to the level 1 for groove portions other than the above. In this embodiment, the signal amplitude was set to 70% for the level A and 50% for the level 1 provided that the signal amplitude for the level 4 was 100%.

As shown in FIG. 3, when the in-groove pit formation portion was subjected to the exposure, then the exposure was performed at the level 4 during a period from the start to 1T to 1.5T (T: clock cycle), and the exposure was subsequently performed while lowering the exposure intensity to the level A. Further, the exposure was performed while returning to the exposure intensity to the level 4 again during a period of 1T to 1.5T until arrival at the end of the in-groove pit formation portion. Accordingly, the width of the in-groove pit formation portion in the radial direction of the master disk is not widened in the vicinity of the middle portion of the in-groove pit formation portion, probably for the following reason. That is, it is considered that the totalized amount of exposure was reduced during the period in which the exposure was performed at the level A, and the exposure range was suppressed from being widened in the radial direction of the master disk during the period. The in-groove pits in the in-groove pit area of the substrate are formed to have a desired pattern with any one of the channel bit lengths of 3T to 1T and 14T in the direction of the track (groove). The width is scarcely widened by the influence of the totalized amount of exposure at the in-groove pit formation portion formed with 3T as the shortest channel bit length. Therefore, the two-stage change of the exposure intensity as described above was not performed, and the exposure was performed while fixing the exposure intensity to the level 4. In this embodiment, the width of the in-groove pit formation portion having the channel bit length longer than the shortest bit length was successfully allowed to have the size equivalent to the width of the in-groove pit formation portion having the shortest channel bit length by switching or changing the exposure intensity as described above. The clock cycle T is appropriately adjustable depending on the reproducing apparatus to be used.

In this embodiment, as shown in FIG. 3, the period, in which the exposure intensity of the laser beam was temporarily at the 0 level, was provided every time when the exposure intensity was switched from the level 4 to the level 1 or when the exposure intensity was switched from the level 1 to the level 4. The period of the 0 level was changed depending on the channel bit length of the pit to be formed. When the exposure was performed for the in-groove pit formation portion of the shortest channel bit length 3T, the period of the 0 level was 0.2T. Accordingly, the processing accuracy is improved for the in-groove pit portion of the master disk.

Figure 4A:
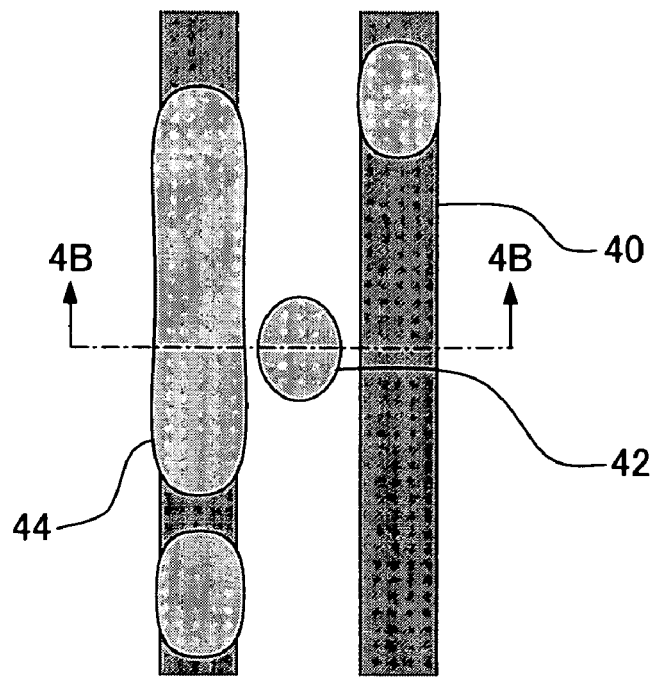
FIG. 4A shows a schematic top view illustrating a part of the glass master disk obtained immediately after the photoresist exposure and the development in the first embodiment.
Figure 4B:
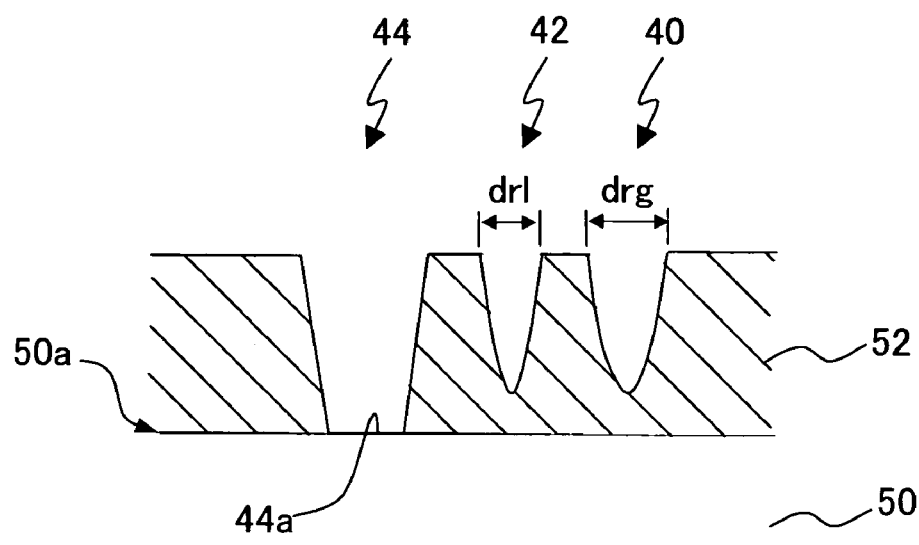
FIG. 4B shows a sectional view taken along a line 4B—4B shown in FIG. 4A.

Subsequently, the glass master disk, on which the photoresist had been photosensitized, was taken out from the cutting apparatus to perform a development treatment. Accordingly, as shown in FIGS. 4A and 4B, a groove formation section 40, an in-groove pit formation section 44, and a land prepit formation section 42 were formed on the glass master disk 50. Each of the groove formation section 40 and the land prepit formation section 42 is formed so that the cross section is V-shaped and groove-shaped. In this situation, the groove width dr1 of the land prepit formation section 42 is narrower than the groove width drg of the groove formation section 40. Further, the photoresist 52 on the glass master disk 50 is removed by the development treatment in the in-groove pit formation section 44. As shown in FIG. 4B, the surface 50*a* of the glass master disk 50 appears as an exposed section 42*a*.

Figure 6A:
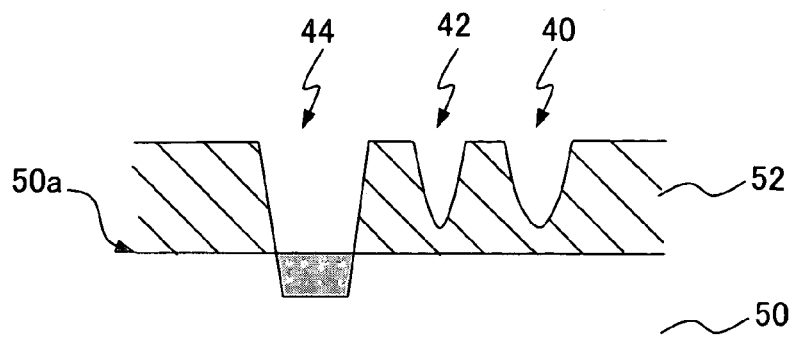
FIGS. 6A to 6D illustrate a process for manufacturing a glass master disk including an in-groove pit formation area in a first embodiment.

Subsequently, as shown in FIG. 6A, the surface of the photoresist 52 formed on the glass master disk 50 was subjected to the etching in a $C_2F_6$ gas atmosphere by using an unillustrated RIE (reactive ion etching) apparatus.

Figure 6B:
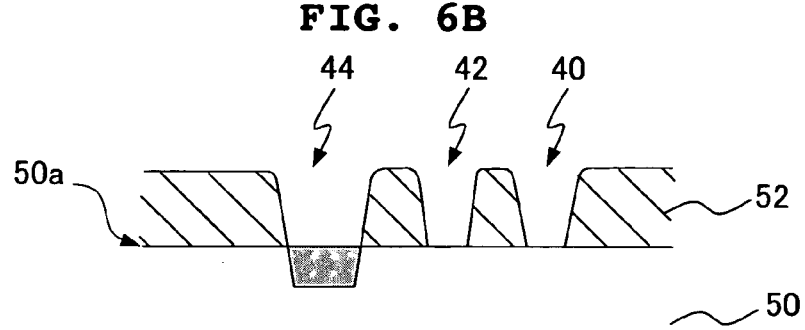
Figure 6C:
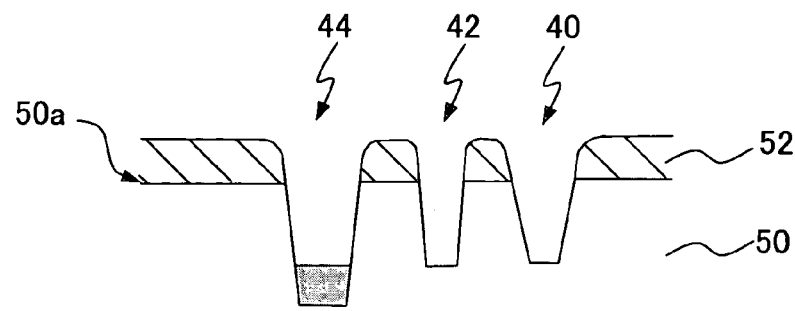

Accordingly, the in-groove pit formation section 44 is etched until arrival at a depth of 90 nm from the surface 50*a* of the glass master disk 50. Subsequently, as shown in FIG. 6B, in order to expose the surface 50*a* of the glass master disk 50 at the groove formation section 40 and the land prepit formation section 42, the photoresist 52 was eroded or scraped by a predetermined thickness by using an unillustrated resist ashing apparatus based on $O_2$.

Accordingly, the glass master disk surface 50*a* was exposed at the groove formation section 40 and the land prepit formation section 42. Further, as shown in FIG. 6C, RIE was performed again in the $C_2F_6$ gas atmosphere for the formation surface of the photoresist 52 of the glass master disk 50. Accordingly, the groove formation section 40 was etched until arrival at a depth of 175 nm from the glass master disk surface 50a.

Figure 6D:
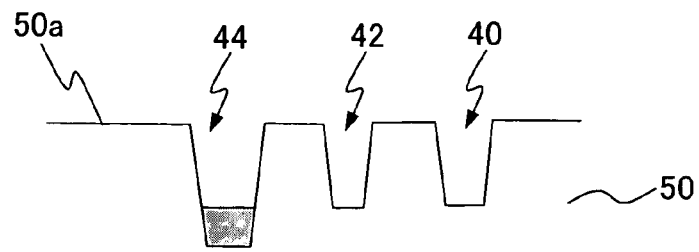

Further, the land prepit formation section 42 was etched until arrival at a depth of 175 nm from the glass master disk surface 50a. Simultaneously, the in-groove pit formation section 44 was etched until arrival at a depth of 265 nm from the glass master disk surface 50a. Subsequently, as shown in FIG. 6D, the resist ashing apparatus (not shown) was used again to remove the photoresist 52 from the surface of the glass master disk 50. Accordingly, the glass master disk 50, which had a desired pattern formed on the surface, was obtained.

Electroless plating was applied as a pretreatment for the plating onto the pattern formation surface of the glass master disk 50. An Ni layer having a thickness of 0.3 mm was formed by means of the electrocasting method by using the plating layer as a conductive film. Subsequently, the surface of the Ni layer formed on the glass master disk 50 was polished, and the Ni layer was exfoliated from the glass master disk. Thus, a stamper was obtained. The conductive film to be formed in the pretreatment for the plating may be formed by using the sputtering method or the vapor deposition method.

Method for Manufacturing Information-Recording Medium

Figure 10A:
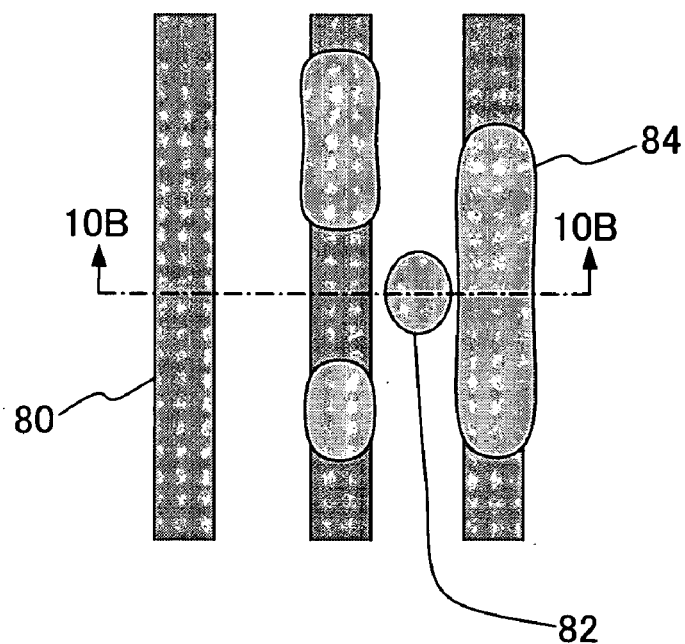
FIG. 10A shows a schematic top view illustrating those disposed in the vicinity of in-groove pits on the substrate obtained in the first embodiment.

The stamper was installed to an existing injection molding machine, and the substrate 1 was obtained by the injection molding. The substrate 1 is made of polycarbonate having a diameter of 120 mm and a thickness of 0.6 mm. As shown in FIG. 8, the pattern, which has the same shape as the shape of the concave/convex pattern formed on the glass master disk, is transferred onto one surface of the substrate 1. As described above, the groove area 71, the in-groove pit area 73, and the groove area (user data area) 75 are formed on the substrate 1. Further, as shown in FIG. 10A, the groove 80, the land prepit 82, and the in-groove pit 84 are formed in the in-groove pit area (73). Among them, the width of the in-groove pit having the shortest channel bit length 3T in the radial direction of the substrate and the widths of the in-groove pits having the lengths longer than the above in the radial direction of the substrate were measured by using a scanning probe microscope produced by Digital Instruments. The maximum width of the in-groove pit having the shortest channel bit length 3T was 0.34 μm. The maximum width of the in-groove pit having the channel bit length 11T was 0.38 μm. Further, the maximum width of the in-groove pit having the channel bit length 14T was 0.4 μm. According to the experiments performed by the present inventors, the following fact is appreciated. That is, the ratio of the maximum width of the in-groove pit having the channel bit length longer than the shortest channel bit length 3T with respect to the maximum width of the in-groove pit having the shortest channel bit length 3T is within a range of 112 to 118%. The width is suppressed from being widened in the radial direction of the substrate in relation to the in-groove pit having the length longer than the shortest channel bit length.

A solution, which had a concentration of 1% by weight of an azo dye represented by the following chemical formula (1), was applied onto the pattern formation surface of the substrate 1 by means of the spin coat method so that the thickness was 30 nm between the grooves, i.e., at the land portion. In this procedure, the amount of application of the solution was 1 g. The substrate was rotated at a number of revolutions of 100 rpm for 30 seconds after the start of the application, and then the substrate was rotated at a number of revolutions of 800 to 1000 rpm for 30 seconds. When the dye solution was applied, tetrafluoropropanol was used as a solvent to prepare the azo dye solution, and impurities were removed by performing filtration through a filter. Subsequently, the substrate 1, onto which the dye material had been applied, was dried for 1 hour at 70° C., followed by being cooled for 1 hour at room temperature. Thus, the recording layer 2 was formed on the substrate 1 (see FIG. 10B).

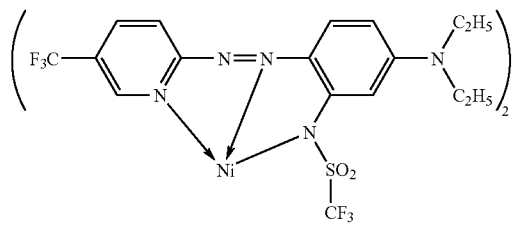

(1)

Figure 10B:
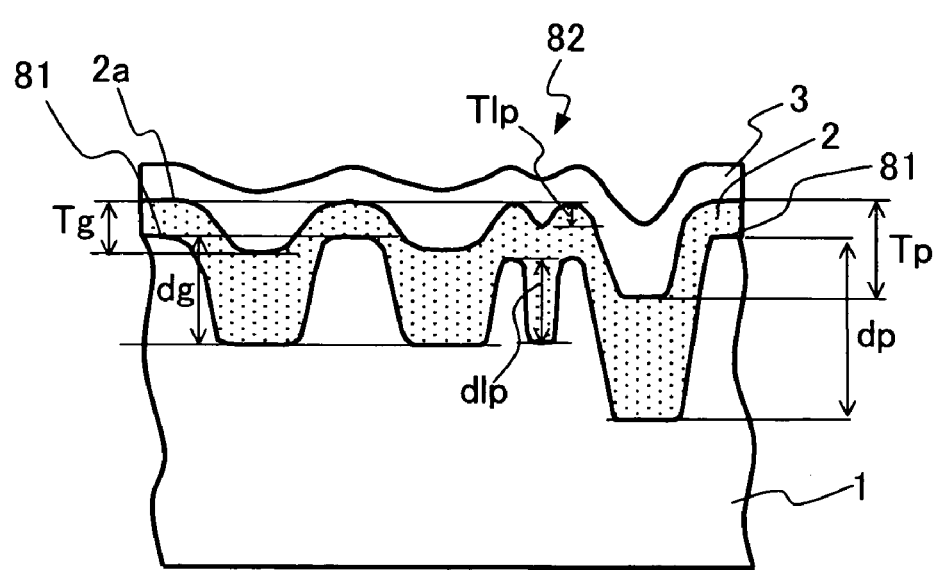
FIG. 10B shows a schematic sectional view illustrating a state in which a recording layer and a reflective layer are formed on the substrate which has a sectional view taken along a line 10B—10B shown in FIG. 10A.

Further, as shown in FIG. 10B, an Ag alloy was formed to have a thickness of 100 nm as the reflective layer 3 on the recording layer 2 by using the sputtering method. Subsequently, a UV-curable resin material was applied onto the reflective layer 3 by means of the spin coat method so that the thickness was 10 μm. Further, a substrate (dummy substrate) made of polycarbonate having a thickness of 0.6 mm was placed thereon. The substrate, on which the respective layers had been formed, was irradiated with UV in this state, and thus the substrate formed with the respective layers and the dummy substrate were stuck to one another to obtain the optical information-recording medium.

The maximum depths of the in-groove pit, the groove, and the land prepit in the in-groove pit area 73 were measured for the optical information-recording medium obtain as described above by using a scanning probe microscope produced by Digital Instruments. As shown in FIG. 10B, the depths were determined from the surface of the land 81 of the substrate. The maximum depth dg of the groove was 175 nm. The maximum depth dp of the in-groove pit was 265 nm. The maximum depth dlp of the land prepit was 175 nm which was the same as the maximum depth dg of the groove. The recording layer recess depths of the in-groove pit, the groove, and the land prepit in the in-groove pit area 73 were measured by using a scanning probe microscope produced by Digital Instruments. The recording layer recess depth herein refers to the maximum recess amount of the recording layer 2 on the basis of the reference of the surface 2a of the recording layer 2 formed on the land 81. The recording layer recess depth Tg of the groove was 100 nm. The recording layer recess depth Tp of the in-groove pit was 170 nm. The recording layer recess depth Tlp of the land prepit was 90 nm.

Figure 11A:
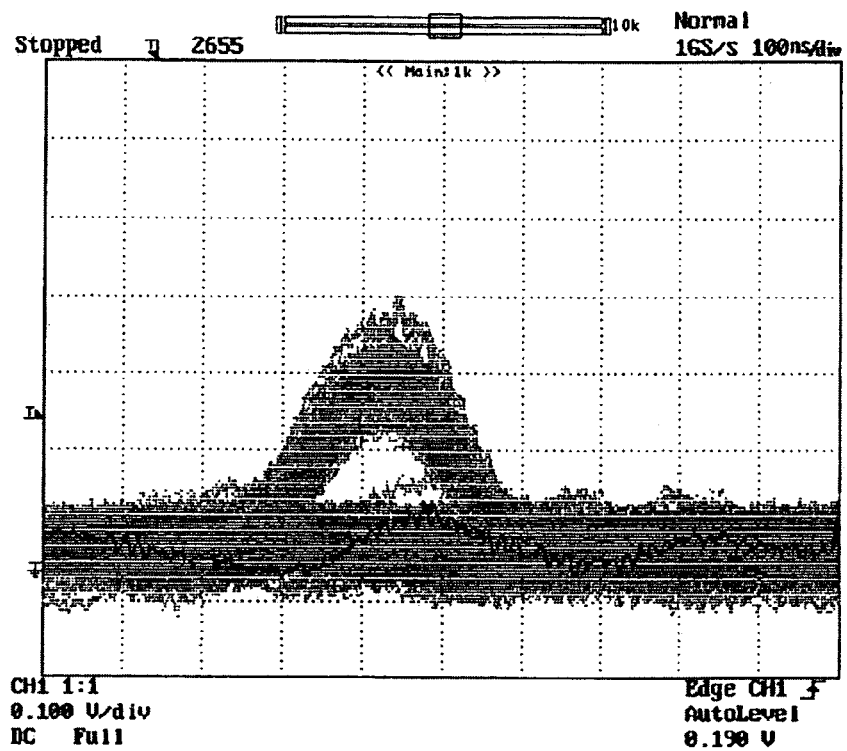
FIG. 11A shows reproduced signals obtained from land prepits formed on the information-recording medium prepared in the first embodiment.
Figure 11B:
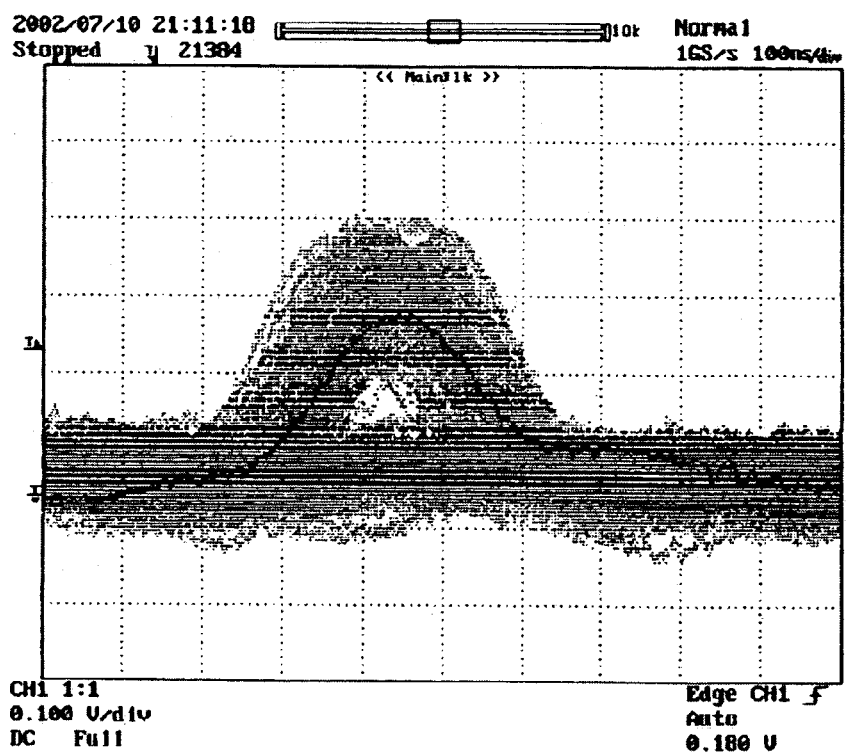
FIG. 11B shows a reproduced signal obtained from an information-recording medium having conventional in-groove pits.

A recording signal recorded in the in-groove pit area was reproduced on the optical information-recording medium obtained in the embodiment described above by using an optical pickup with a laser beam having a wavelength of 650 nm and a lens having a numerical aperture of 0.6. The detection and the reproduction of the signal were successfully performed in a stable manner. In this procedure, the signal modulation factor of the reproduced signal was 61%, and the jitter was 7.2%. Satisfactory results were successfully obtained in any case. Further, as shown in FIG. 11A, the recording signal recorded on the land prepits was successfully detected in a stable manner as well. Accordingly, the aperture ratio also satisfied the requested value, and the error rate also sufficiently satisfied 5% as specified in the standard.

In the case of the optical information-recording medium of the embodiment described above, polycarbonate is used for the substrate. However, for example, polymethyl methacrylate or amorphous polyolefin may be used.

Second Embodiment

Method for Manufacturing Master Disk and Stamper for Manufacturing Substrate

As shown in FIG. 14, a substrate of an information-recording medium according to this embodiment has a groove area 71, a boundary groove area 76, a boundary pit area 72, an in-groove pit area 73, a boundary pit area 74, a boundary groove area 77, and a groove area 75 which are formed in this order from the inner circumferential side of the substrate 1. A method for manufacturing a master disk and a stamper for manufacturing the substrate 1 is as follows. That is, the exposure intensity of the laser beam LS to be radiated onto the glass master disk 50 is changed with the optical modulator while moving the laser beam LS on the glass master disk 50 in the same manner as in the first embodiment. In this embodiment, as shown in FIG. 15, the exposure intensity of the laser beam was changed at four levels, i.e., a level 1, a level 2, a level 3, and a level 4 as ordered from those having lower exposure intensities. An area, which has radiuses of 19.0 mm to 24.0 mm on the basis of the central axis (AX) of the glass master disk, corresponds to the groove area 71 of the substrate 1 shown in FIG. 14 (hereinafter referred to as "first groove formation area"). An area, which has radiuses of 24.0 mm to 24.1 mm, corresponds to the in-groove pit area 73 of the substrate 1 (hereinafter referred to as "in-groove pit formation area"). An area, which has radiuses of 24.1 mm to 58.9 mm, is a user data area which corresponds to the groove area 75 of the substrate 1 (hereinafter referred to as "second groove formation area"). Further, areas (hereinafter referred to as "boundary pit formation areas"), each of which was formed with in-groove pits corresponding to an amount of 1 track, were provided at boundary portions between the in-groove pit formation area and the first and second groove formation areas. The boundary pit formation areas correspond to the boundary pit areas 72, 74 of the substrate 1 shown in FIG. 14. Grooves (hereinafter referred to as "boundary groove formation areas"), which had widths wider than those of grooves in the groove area, were formed in an amount corresponding to 1 track between the groove formation area and the boundary pit formation area. The boundary groove formation areas correspond to the boundary groove areas 76, 77 of the substrate 1 shown in FIG. 14.

In this embodiment, the ratios of the respective levels were set as follows provided that the level 4 was 100%. That is, the level 3 was 90%, the level 2 was 60%, and the level 1 was 55%. As shown in FIG. 15, the exposure intensity was set to the level 1 in each of the first and second groove formation areas. In the in-groove pit formation area, the exposure intensity was set to the level 4 for the in-groove pit formation portion, and the exposure intensity was set to the level 1 for the groove portions other than the above. In the boundary groove formation area, the exposure intensity was set to the level 2 for the groove formation portion. In the boundary pit formation area, the exposure intensity was set to the level 3 for the in-groove pit formation portion, and the exposure intensity was set to the level 1 for the groove portions other than the above. In the case of the optical information-recording medium of this embodiment, the groove width is changed gently in the region ranging from the boundary groove area to the boundary pit area. Therefore, the disturbance and the offset of the radial push-pull signal hardly occur. Accordingly, it is possible to obtain a sufficient modulation factor even in the case of the in-groove pit formed in the in-groove pit formation area. Therefore, the pattern of the in-groove pits formed in the boundary pit formation area is not limited to the random pattern such as the dummy, which may be a recording signal pattern of user information as well.

Accordingly, the pattern, which corresponds to the in-groove pits, is also formed for the pattern of the in-groove pit formation portion in the boundary pit formation area of the master disk. The respective in-groove pits, which are formed in the boundary pit formation area, are formed with any one of the channel bit lengths of 3T to 11T and 14T (T: clock cycle) in the tangential direction of the track. The shortest channel bit length is adjustable in conformity with the reproducing apparatus to be used.

In this embodiment, when the exposure intensity was changed during the exposure, the period, in which the exposure intensity of the laser beam was temporarily at the zero (0) level, was provided every time when the exposure intensity was switched. Further, in this embodiment, the master disk was subjected to the exposure while controlling the exposure intensity as follows for the respective in-groove pit formation portions having the predetermined pit lengths in the in-groove pit formation area. As shown in FIG. 15, the exposure was performed at the level 4 during a period from the start of the exposure to 1T to 1.5 T (T: clock cycle). Subsequently, the exposure was performed while lowering the exposure intensity to a level (level A) which was 70% with respect to the level 4 during a predetermined period. Further, the exposure was performed while returning the exposure intensity to the level 4 again during a period of 1 T to 1.5 T until arrival at the end of the in-groove pit formation portion. Accordingly, the widths of the respective in-groove pit formation portions in the radial direction of the master disk are prevented from being widened in the vicinity of the middle portion of the in-groove pit formation portion in the track direction. The exposure intensity may be also controlled in the same manner as described above for the exposure intensity for the in-groove pit formation portion in the boundary pit formation area.

Figure 16A:
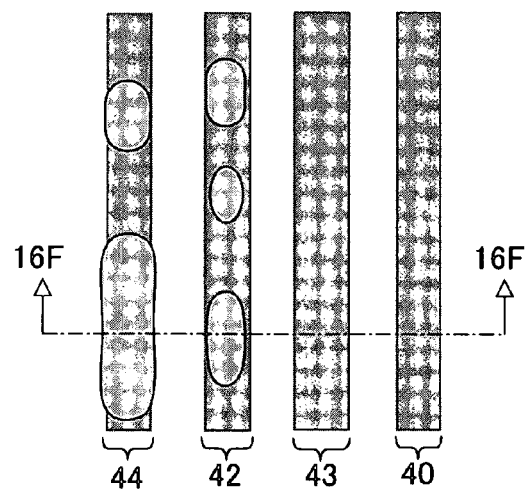
FIG. 16A shows a schematic top view illustrating the glass master disk for making the substrate of the optical information-recording medium obtained in the second embodiment.
Figure 16B:
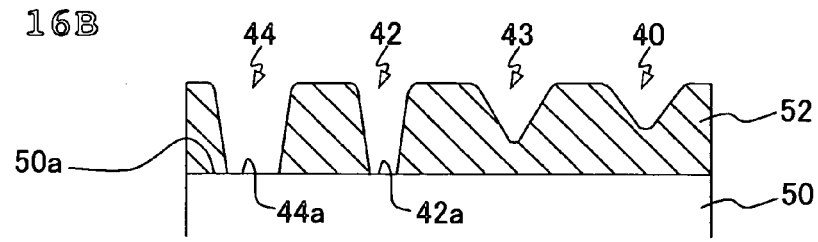
FIGS. 16B to 16F show steps illustrating the process for etching the exposed master disk.

Subsequently, the glass master disk, on which the photoresist had been photosensitized, was taken out from the cutting apparatus to perform a development treatment. Accordingly, as shown in FIGS. 16A to 16F, a groove formation section 40, a boundary pit formation section 42, a boundary groove formation section 43, and an in-groove pit formation section 44 were formed on the glass master disk 50. Each of the groove formation section 40 and the boundary groove formation section 43 is formed so that the cross section is V-shaped and groove-shaped. The photoresist 52 on the glass master disk 50 is removed by the development treatment in the boundary pit formation section 42 and the in-groove pit formation section 44. As shown in FIG. 16B, the surface 50a of the glass master disk 50 appears as an exposed section 42a and an exposed section 44a respectively. The width of the exposed section 42a in the radial direction of the glass master disk is narrower than the width of the exposed section 44a of the in-groove pit formation section 44.

Figure 16C:
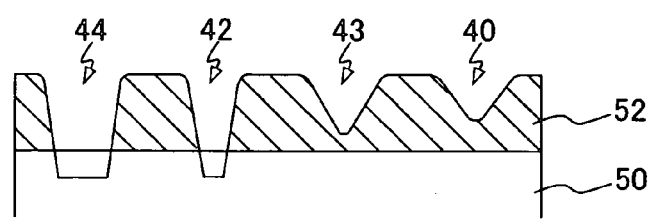
Figure 16D:
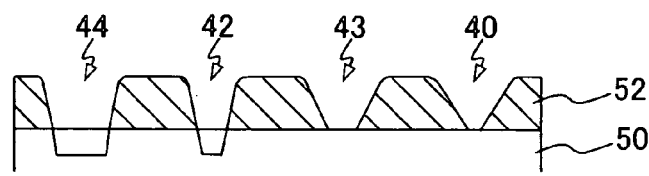
Figure 16E:
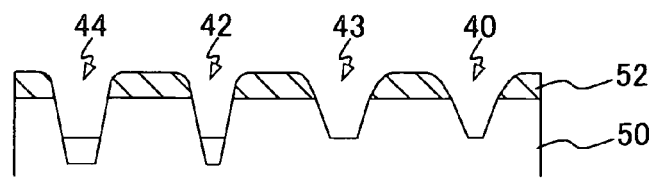
Figure 16F:
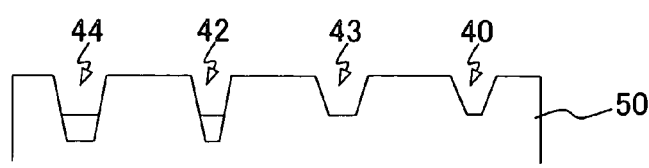

Subsequently, in the same manner as in the first embodiment, the surface of the photoresist 52 formed on the glass master disk 50 was subjected to the etching in a $C_2F_6$ gas atmosphere by using an RIE (reactive ion etching) apparatus shown in FIG. 19. Accordingly, as shown in FIG. 16C, each of the boundary pit formation section 42 and the in-groove pit formation section 44 of the glass master disk 50 is etched until arrival at a predetermined depth. Subsequently, the photoresist 52 was eroded or scraped by a predetermined thickness by using an unillustrated resist ashing apparatus based on $O_2$ (FIG. 16D), and RIE was performed again in a $C_2F_6$ gas atmosphere (FIG. 16E). Subsequently, the photoresist 52 on the glass master disk 50 was removed by using the resist ashing apparatus again. Accordingly, the glass master disk 50, which had a desired pattern formed on the surface as shown in FIG. 16F, was obtained. The boundary groove formation section was formed to be wider than the groove formation section.

Electroless plating was applied as a pretreatment for the plating onto the pattern formation surface of the glass master disk 50. An Ni layer having a thickness of 0.29 mm was formed by the electrocasting method by using the plating layer as a conductive film. Subsequently, the surface of the Ni layer formed on the glass master disk 50 was polished, and the Ni layer was exfoliated from the glass master disk. Thus, a stamper was obtained.

Method for Manufacturing Information-Recording Medium

Figure 17:
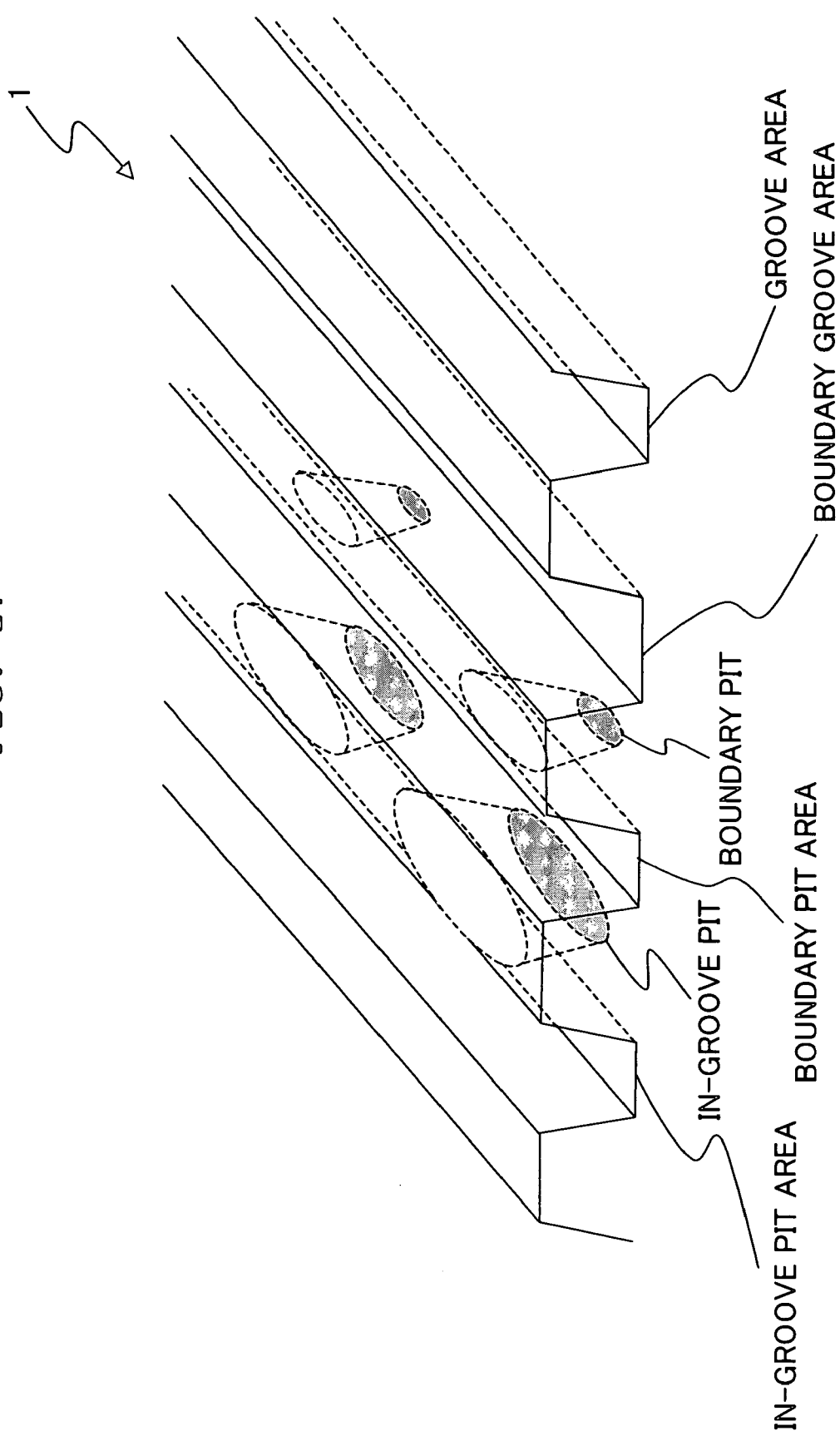
FIG. 17 shows a schematic perspective view illustrating the substrate obtained in the second embodiment.

The stamper was installed to an existing injection molding machine, and the substrate 1 was obtained by means of the injection molding. The substrate 1 is made of polycarbonate having a diameter of 120 mm and a thickness of 0.6 mm. As shown in FIG. 17, the pattern, which has the same shape as the shape of the concave/convex pattern formed on the glass master disk, is transferred onto one surface of the substrate 1. As described above, the groove area 71, the boundary groove area 76, the boundary pit area 72, the in-groove pit area 73, the boundary pit area 74, the boundary groove 77, and the groove area (user data area) 75 are formed on the substrate 1 as shown in FIG. 14. The substrate 1 was used to obtain the optical information-recording medium in the same manner as in the first embodiment.

The maximum depths of the in-groove pit portion in the in-groove pit area 73, the boundary pit portion in the boundary pit area 74, the groove portion in the boundary groove area 76, and the groove portion in the groove area 75 were measured for the optical information-recording medium obtained as described above by using AFM produced by Digital Instruments. As shown in FIG. 18B, the maximum depth dg of the groove portion was 170 nm. The maximum depth dgb of the boundary groove portion was 170 nm. The maximum depth dpb of the boundary pit portion was 260 nm. The maximum depth dp of the in-groove pit portion was 260 nm. It is desirable that the maximum depth dg of the groove portion and the maximum depth dp of the in-groove pit portion satisfy the condition of $1.4 \leq dp/dg \leq 1.7$ in order to obtain the satisfactory recording and reproduction signal characteristics including, for example, those concerning the signal modulation factor and the jitter.

The half value width Wp of the in-groove pit portion in the in-groove pit area 73, the half value width Wpb of the boundary pit portion in the boundary pit area 74, the half value width Wgb at the groove portion in the boundary groove area 76, and the half value width Wg at the groove portion in the groove area 75 were measured respectively on the basis of the surface of the land 80 by using AFM produced by Digital Instruments. The half value width Wg was 320 nm, the half value width Wgb was 330 nm, the half value width Wpb was 360 nm, and the half value width Wp was 400 nm. Accordingly, it is appreciated that the relationship of $Wg \leq Wgb \leq Wpb \leq Wp$ holds. The ratio Wp/Wpb is equal to 1.11 between the half value width Wp and the half value width Wpb. It is appreciated that the condition of $1.05 \leq Wp/Wpb \leq 1.15$ is satisfied. Further, the ratio Wgb/Wg is equal to 1.03 between the half value width Wgb and the half value width Wg. It is appreciated that the condition of $1.03 \leq Wgb/Wg \leq 1.15$ is satisfied.

Figure 18A:
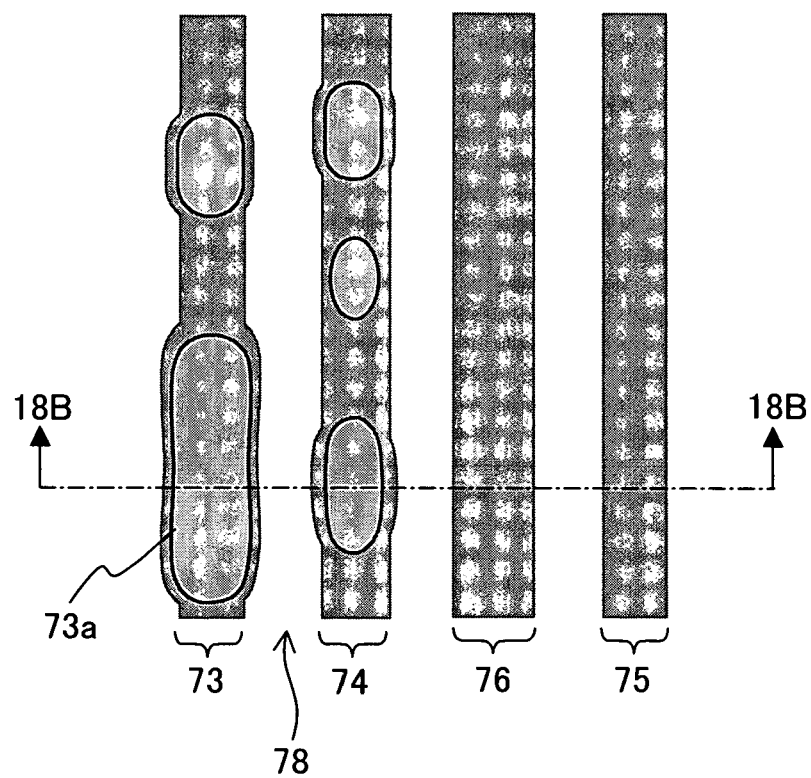
FIG. 18A shows a schematic top view illustrating the optical information-recording medium obtained in the second embodiment.
Figure 18B:
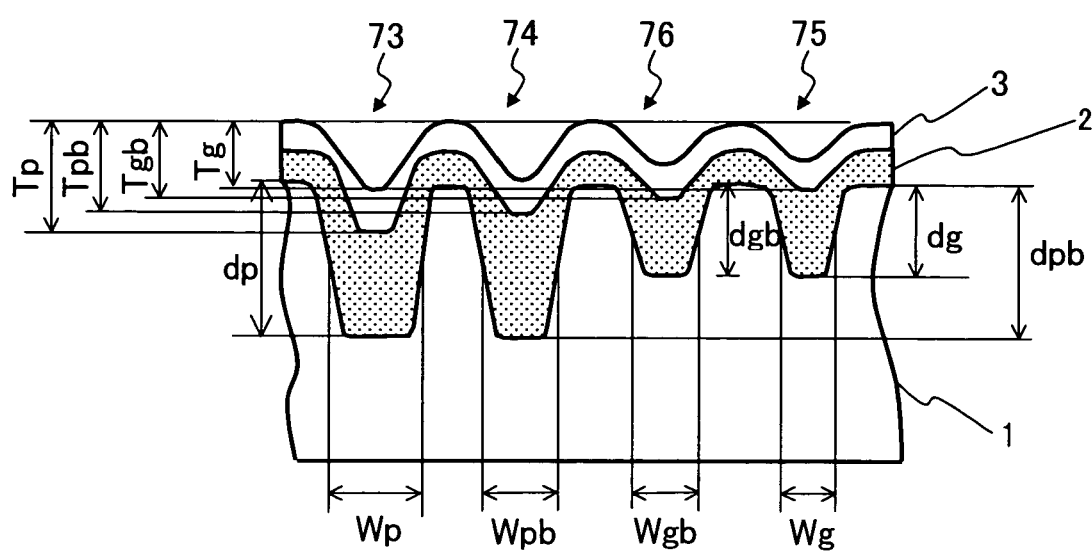
FIG. 18B shows a sectional view taken along a line 18B—18B shown in FIG. 18A.

In the case of the optical information-recording medium obtained in this embodiment, as shown in FIG. 18A, the width of the in-groove pit 73a in the in-groove pit area 73 in the radial direction of the substrate is suppressed from being widened in the vicinity of the middle portion in the track direction as a result of the exposure performed in accordance with the exposure schedule as described above. Accordingly, the land surface, which has a sufficient areal size, can be secured at the land portion 78 disposed adjacently to the in-groove pit as well. Therefore, it is possible to obtain a stable radial push-pull signal from the optical information-recording medium.

Further, in order to adjust the effect to suppress the width of the in-groove pit 73a from being widened, a scanning probe microscope produced by Digital Instruments was used to measure the width in the radial direction of the substrate of the in-groove pit having the shortest channel bit length 3T and the widths in the radial direction of the substrate of the in-groove pits having the channel bit lengths longer than the above respectively. The maximum width of the in-groove pit having the shortest channel bit length 3T was 0.34 μm. The maximum width of the in-groove pit having the channel bit length 11T was 0.38 μm. The maximum width of the in-groove pit having the channel bit length 14T was 0.4 μm. According to the experiments performed by the present inventors, the following fact is appreciated. That is, the ratio of the maximum width of the in-groove pit having the channel bit length longer than the shortest channel bit length 3T with respect to the maximum width of the in-groove pit having the shortest channel bit length 3T is within a range of 112 to 118%. The width in the radial direction of the substrate is suppressed from being widened for the in-groove pit having the length longer than the shortest channel bit length.

The recording layer recess depths were measured for the in-groove pit portion in the in-groove pit area 73, the boundary pit portion in the boundary pit area 74, and the groove portions in the boundary groove area 76 and the groove area 75 of the obtained optical information-recording medium were measured by using AFM produced by Digital Instruments. As shown in FIG. 18B, the recording layer recess depth Tp in the in-groove pit area 73 was 170 nm. The recording layer recess depth Tpb in the boundary pit area 74 was 135 nm. The recording layer recess depth Tgb in the boundary groove area 76 was 110 nm. The recording layer recess depth Tg in the groove area 75 was 100 nm. As for the recording layer recess depth Tp and the recording layer recess depth Tg, it is desirable that the condition of $1.6 \leq Tp/Tg \leq 2.0$ is satisfied in order to obtain the satisfactory recording and reproduction signal characteristics including, for example, those concerning the signal modulation factor and the jitter in the same manner as in the first embodiment.

According to the relationship of the groove half value widths in the respective areas described above, the relationship of $Tg<Tgb<Tpb<Tp$ holds for the relationship among the recording layer recess depth Tpb in the boundary pit area 74, the recording layer recess depth Tp in the in-groove pit area 73, the recording layer recess depth Tgb in the boundary groove area 76, and the recording layer recess depth Tg in the groove area 75.

A recording signal recorded in the in-groove pit area was reproduced on the optical information-recording medium obtained in the embodiment described above by using an optical pickup with a laser beam having a wavelength of 650 nm and a lens having a numerical aperture of 0.6. The detection and the reproduction of the signal were successfully performed in a stable manner. Further, in this procedure, the signal modulation factor of the reproduced signal was 61%, and the jitter was 7.2%. Satisfactory results were successfully obtained in any case.

In this embodiment, the boundary portion between the groove portion and the in-groove pit portion was designed to provide both of the boundary pit portion and the boundary groove portion. However, an equivalent effect can be also obtained even when only the boundary pit or only the boundary groove is provided.

Figure 30A:
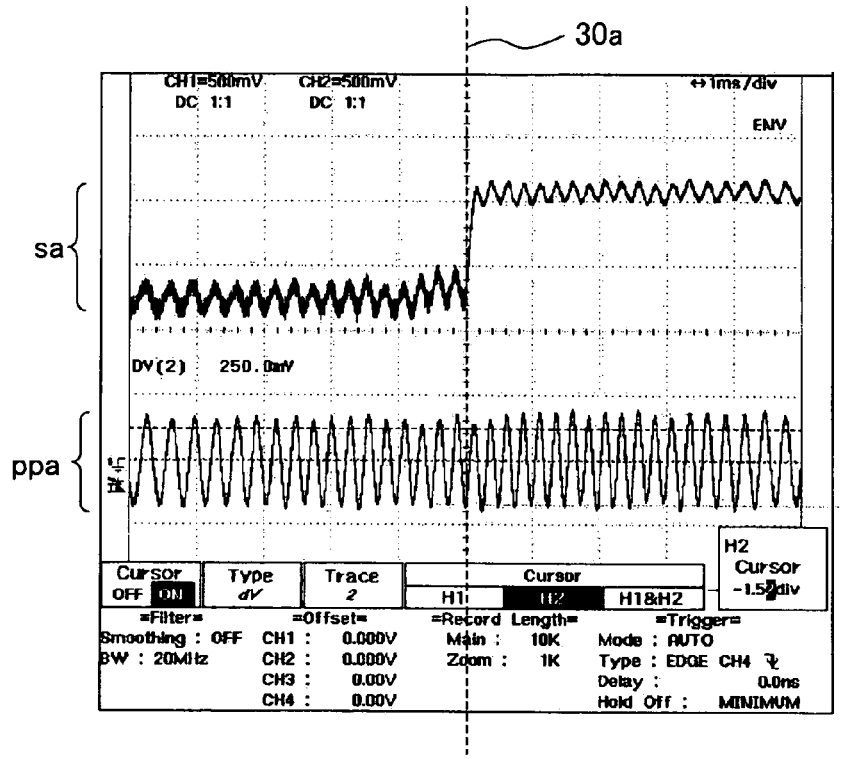
FIG. 30A shows sum signal and the difference signal (radial push-pull signal) obtained in the vicinity of the boundary portion between the in-groove pit area and the groove area on an information-recording medium prepared in the second embodiment.
Figure 30B:
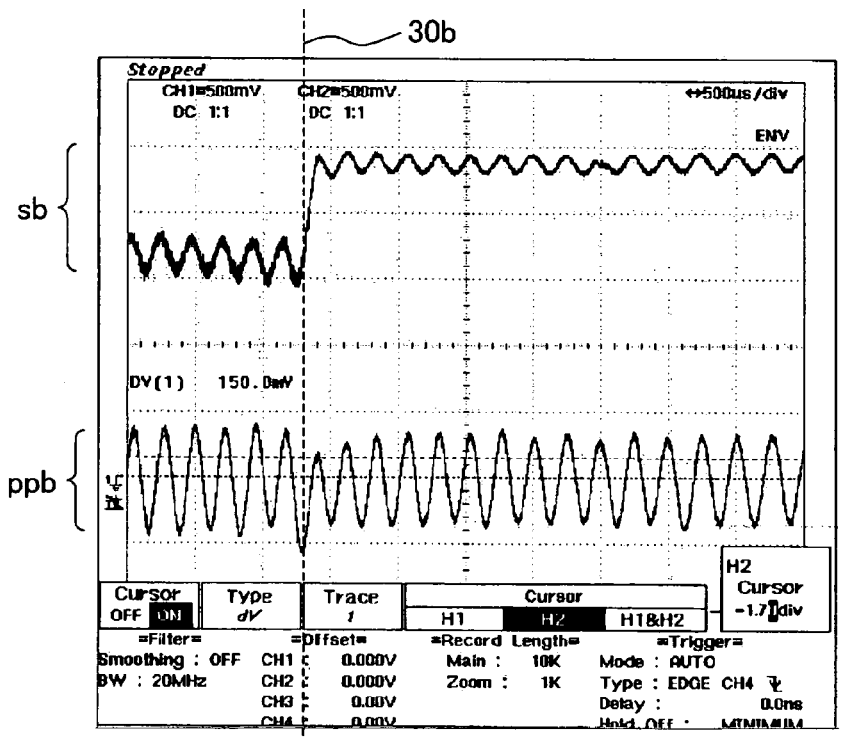
FIG. 30B shows the sum signal and the difference signal (radial push-pull signal) obtained in the vicinity of the boundary portion between the in-groove pit area and the groove area on an information-recording medium prepared in the first embodiment.

Next, a description will be made about a result of comparison between the radial push-pull signal output of the optical information-recording medium manufactured in the second embodiment described above and the radial push-pull signal output of an information-recording medium prepared in the first embodiment. FIG. 30A shows a result of the detection from the optical information-recording medium manufactured in the second embodiment described above, wherein the upper part depicts the output of the sum signal sa from a two-division detector of an optical pickup during the seek, and the lower part depicts the output of the difference signal (radial push-pull signal) ppa. FIG. 30B shows a result of the detection from the optical information-recording medium of the first embodiment, wherein the upper part depicts the output of the sum signal sb during the seek, and the lower part depicts the output of the difference signal (radial push-pull signal) ppb respectively. In both of FIGS. 30A and 30B, the portion, at which the amplitude level of the sum signal sa, sb is greatly changed (portions indicated by the symbol 30a in FIG. 30A and indicated by the symbol 30b in FIG. 30B respectively), is the boundary between the in-groove pit area and the groove area. The disturbance of the difference signal (radial push-pull signal) ppa depicted in the lower part is scarcely observed at the position corresponding to the symbol 30a in FIG. 30A, i.e., at the boundary between the in-groove pit area and the groove area of the optical information-recording medium of the embodiment described above on the other hand, the relatively large disturbance of the difference signal (radial push-pull signal) ppb depicted in the lower part has been successfully confirmed at the position corresponding to the symbol 30b in FIG. 30B, i.e., at the boundary between the in-groove pit area and the groove area of the optical information-recording medium having in-groove pits as explained in the first embodiment. As described above, the tracking is performed by utilizing the radial push-pull signal on DVD-R and DVD-RW. If the amplitude balance of the radial push-pull signal is collapsed, i.e., if the amplitude center is deviated at the boundary between the in-groove pit area and the groove area, then the tracking error tends to appear.

In the case of the optical information-recording medium manufactured in the second embodiment described above, the amount of variation between the radial push-pull signal obtained from the groove portion and the radial push-pull signal obtained from the in-groove pit portion is 36% provided that the amplitude of the radial push-pull signal obtained in the normal state is 100%. Although not specifically prescribed in the DVD-R standards, it is prescribed in the DVD-RW standards that the amount of variation between the radial push-pull signal obtained from the groove portion and the radial push-pull signal obtained from the prepit portion is not less than 20%. Therefore, the optical information-recording medium of the second embodiment described above sufficiently satisfies the standard, which does not cause any tracking deviation (tracking error). On the contrary, in the case of the optical information-recording medium prepared in the first embodiment, the amount of variation is about 18 to 20%. Therefore, the optical information-recording medium prepared in the first embodiment is equivalent to the lower limit value of the standard of DVD-RW.

In the case of the optical information-recording medium of the first and second embodiments, polycarbonate is used for the substrate. However, for example, polymethyl methacrylate or amorphous polyolefin may be used. In the case of the optical information-recording medium of the embodiment described above, the respective layers are formed on the substrate in the order of the recording layer and the reflective layer. However, the respective layers may be formed by firstly forming the reflective layer on the pattern formation surface of the substrate and then forming the recording layer on the reflective layer. Even when the optical information-recording medium is manufactured in accordance with such layer arrangement, it is possible to obtain the same effects as those obtained in the embodiments described above.

Third Embodiment

Method for Manufacturing Master Disk and Stamper for Manufacturing Substrate

Figure 13A:
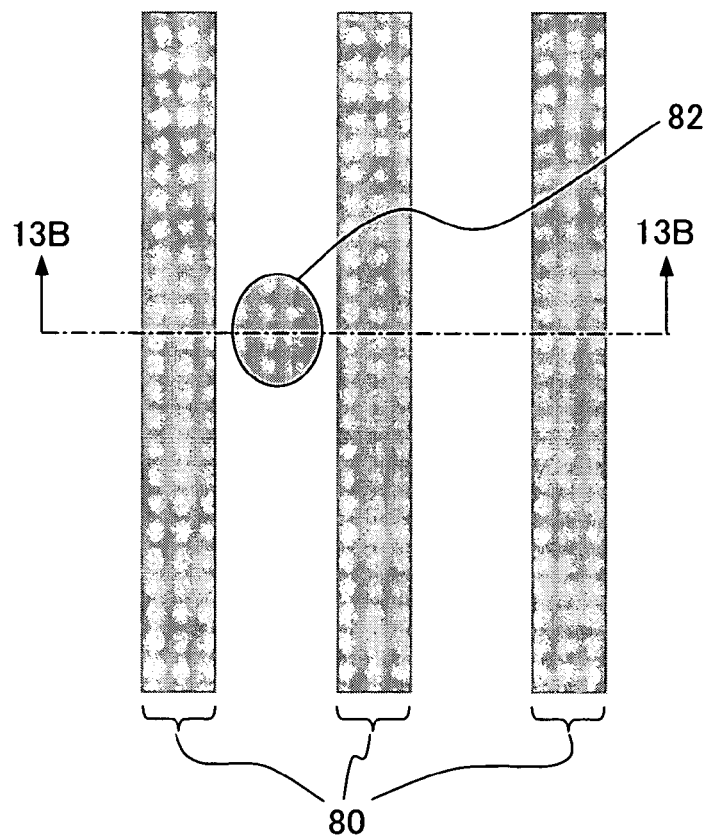
FIG. 13A shows a schematic top view illustrating an area of the substrate in which no in-groove pit is formed in the first embodiment.

As shown in FIG. 9, a substrate 1 of an information-recording medium according to the present invention is comparted into a first groove area 71, an in-groove pit area 73, and a second groove area 75 which are formed in this order from the inner circumferential side of the substrate 1. In the first groove area 71 and the second groove area 75, land prepits 82 are formed on lands defined between grooves 80 as shown in FIG. 13A. In the in-groove pit area 73, land prepits 82 are formed on lands defined between grooves having in-groove pits 84 as shown in FIG. 10A. A master disk and a stamper for manufacturing the substrate 1 are manufactured as follows. That is, the exposure intensity of the laser beam LS to be radiated onto the glass master disk 50 is changed with the optical modulator while moving the laser beam LS in the same manner as in the second embodiment.

In this embodiment, as shown in FIG. 20, the three levels, i.e., the level 1, the level A, and the level 4, which were included in the exposure intensities used in the second embodiment, were used for the exposure intensity of the laser beam to perform the exposure for the master disk. The ratios of the respective levels in this embodiment were set as follows in the same manner as in the first embodiment. That is, the level A was set to 60% and the level 1 was set to 55% provided that the level 4 was 100%. As shown in FIG. 20, the exposure intensity was set to the level 1 in the first and second groove formation areas. In the in-groove pit formation area, the exposure intensity was set to the level 4 for the in-groove pit formation portion, and the exposure intensity was set to the level 1 for the groove portions other than the above.

Land prepits are formed on the lands between the grooves by using a laser beam which is different from the light beam for forming the in-groove pits in the entire region having radiuses of 19 mm to 58.9 mm as shown in FIG. 9. As shown in FIG. 20, the intensity level of the laser beam was at a low level (hereinafter referred to as "first LPP level") for the portion (hereinafter referred to as "first land prepit formation portion") corresponding to the land prepits formed in the in-groove pit area 73 having radiuses of 23.9 mm to 24 mm. A second land prepit level (hereinafter referred to as "second LPP level"), which was at a high level of the intensity level of the laser beam, was used for the portion (hereinafter referred to as "second land prepit formation portion") corresponding to the land prepits in the first and second groove areas 71 and 73 having radiuses of 19 mm to 23.9 mm and radiuses of 24 mm to 58.9 mm. Thus, the two levels were established. The signal output of the first LPP level was 90% provided that the signal output of the second LPP level was 100%.

In this embodiment, as shown in FIG. 20, the period, in which the exposure intensity of the laser beam was temporarily at the 0 level, was provided every time when the exposure intensity was switched from the level 1 to the level 4 or from the level 4 to the level 1. The period, in which the exposure intensity was at the 0 level, was changed depending on the channel bit length of the pit to be formed. The period, in which the exposure intensity was at the 0 level, was 0.2T during the exposure for the in-groove pit formation portion having the shortest channel bit length 3T. Accordingly, the processing accuracy is improved for the in-groove pit formation portion of the master disk.

Figure 28A:
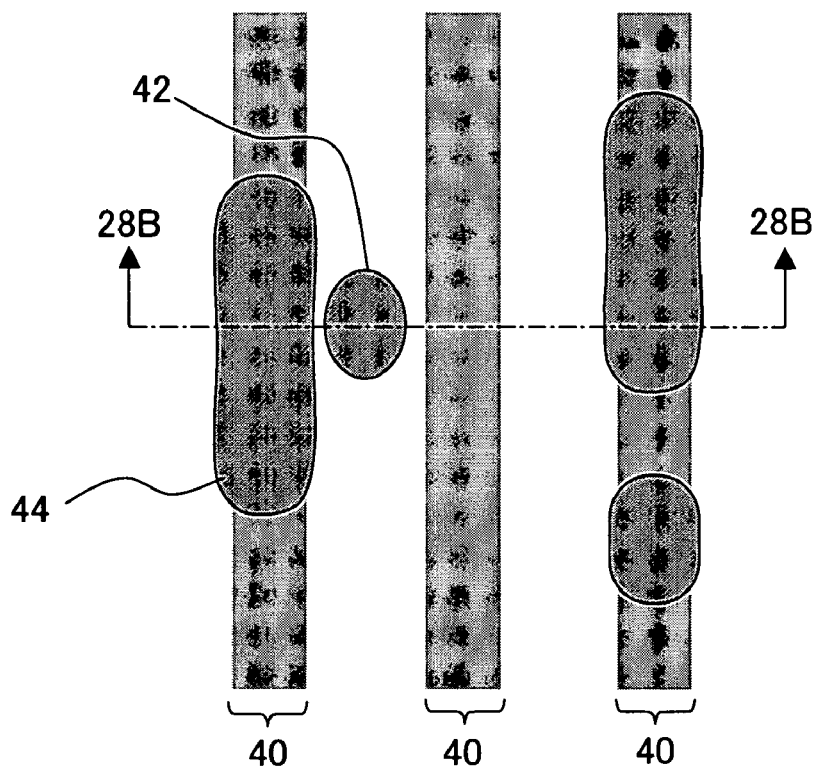
FIG. 28A shows a schematic top view illustrating a part of the glass master disk obtained immediately after the photoresist exposure and the development in the third embodiment.
Figure 28B:
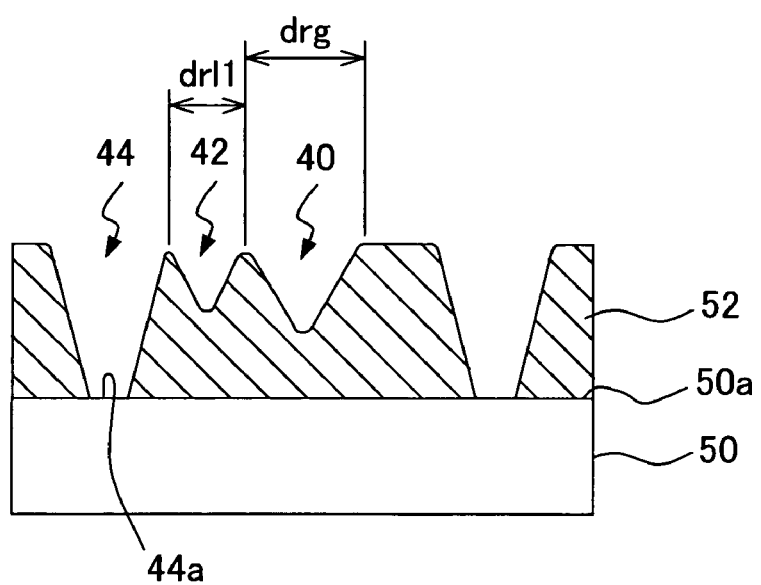
FIG. 28B shows a sectional view taken along a line 28B—28B shown in FIG. 28A.

Subsequently, in the same manner as in the second embodiment, the glass master disk, on which the photoresist had been photosensitized, was taken out from the cutting apparatus to perform a development treatment. Accordingly, as shown in FIGS. 28A and 28B, a groove formation section 40, an in-groove pit formation section 44, and a first land prepit formation section 42 in the in-groove pit formation area were formed on the glass master disk 50. Each of the groove formation section 40 and the first land prepit formation section 42 is formed so that the cross section is V-shaped and groove-shaped. In this arrangement, the groove width drl1 of the first land prepit formation section 42 is narrower than the groove width drg of the groove formation section 40. The land portion, which is disposed adjacently to the first land prepit, is affected by the totalized exposure intensity of the exposure intensity for the first land prepit, the exposure intensity for the groove, and the exposure intensity for the in-groove pit, which is developed to some extent, and which is formed in a state of being slightly depressed from the land surface. The photoresist 52 on the glass master disk 50 is removed by the development treatment in the in-groove pit formation section 44. As shown in FIG. 28B, the surface 50a of the glass master disk 50 appears as an exposed section 44a.

Figure 29A:
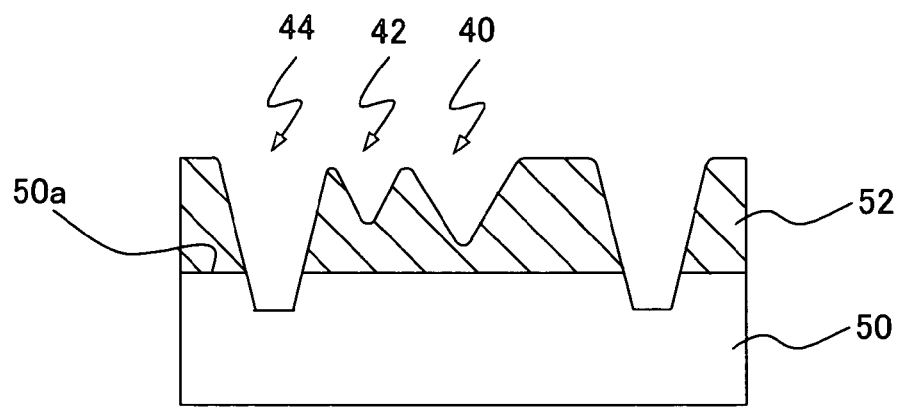
FIGS. 29A to 29D illustrate a process for manufacturing a glass master disk including an in-groove pit formation area in a third embodiment.
Figure 29B:
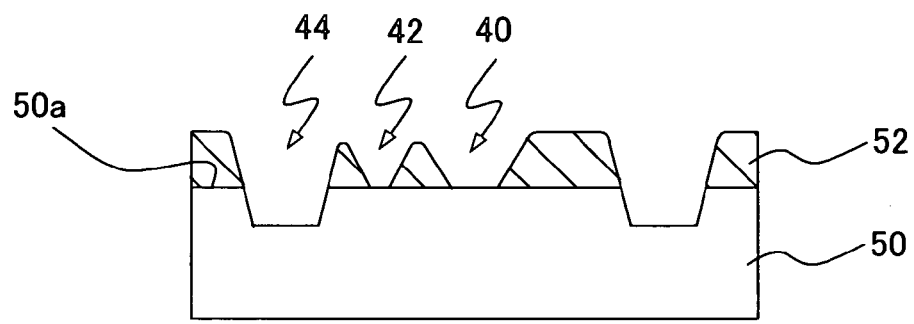
Figure 29C:
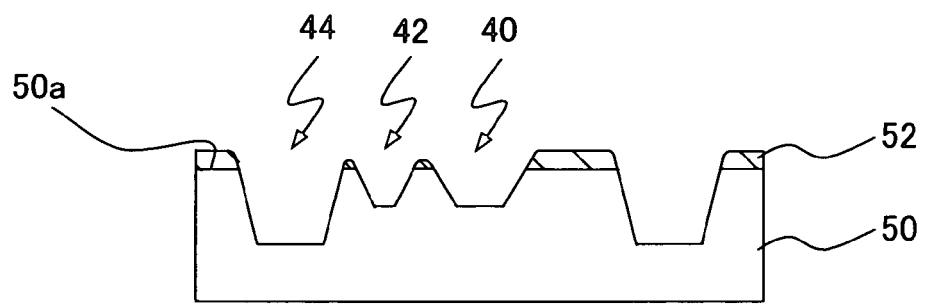
Figure 29D:
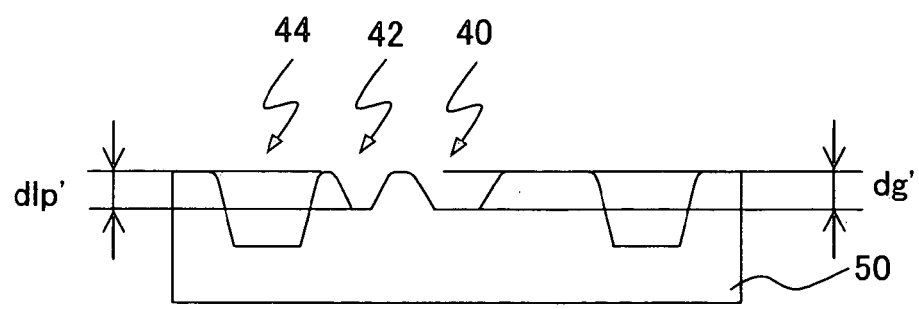

Subsequently, in the same manner as in the second embodiment, the glass master disk was subjected to the etching in accordance with the remaining photoresist pattern by using, for example, an RIE apparatus as shown in FIGS. 29A to 29D. At first, as shown in FIG. 29A, the etching was performed in a $C_2F_6$ gas atmosphere by using the unillustrated RIE apparatus. Accordingly, the in-groove pit formation section 44 was etched from the surface 50a of the glass master disk. Subsequently, as shown in FIG. 29B, the photoresist 52 was eroded or scraped by a predetermined thickness by using an unillustrated resist ashing apparatus based on $O_2$. Accordingly, the glass master disk surface 50a was exposed at the groove formation section 40 and the first land prepit formation section 42. Further, as shown in FIG. 29C, RIE was performed again in a $C_2F_6$ gas atmosphere for the formation surface of the photoresist 52 of the glass master disk 50. Accordingly, the groove formation section 40 was etched until arrival at a depth of 170 nm from the glass master disk surface 50a (dg'=170 nm). The first land prepit formation section 42 undergoes the start of the etching on the way of the process of the $C_2F_6$ treatment, because the photoresist of the side wall is thinner than that of other portions. The first land prepit formation section 42 has the same bottom surface as that of the groove formation section. Therefore, the side wall height dlp' of the first land prepit formation section 42 was 165 nm on the basis of the bottom surface of the groove. Simultaneously, the in-groove pit formation section 44 was etched until arrival at a depth of 260 nm from the glass master disk surface 50a. Subsequently, as shown in FIG. 29D, the resist ashing apparatus (not shown) was used again to remove the photoresist 52 from the glass master disk 50. Accordingly, the glass master disk 50, which had the desired pattern formed on the surface, was obtained.

Figure 5A:
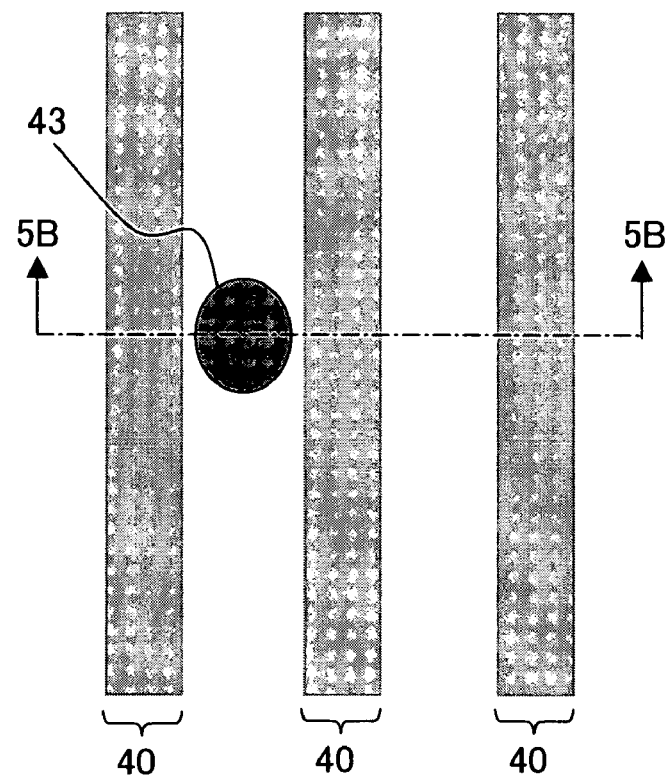
FIG. 5A shows a schematic top view of an area in which no in-groove pit is formed in the first embodiment, illustrating a part of the glass master disk immediately after the photoresist exposure and the development.
Figure 5B:
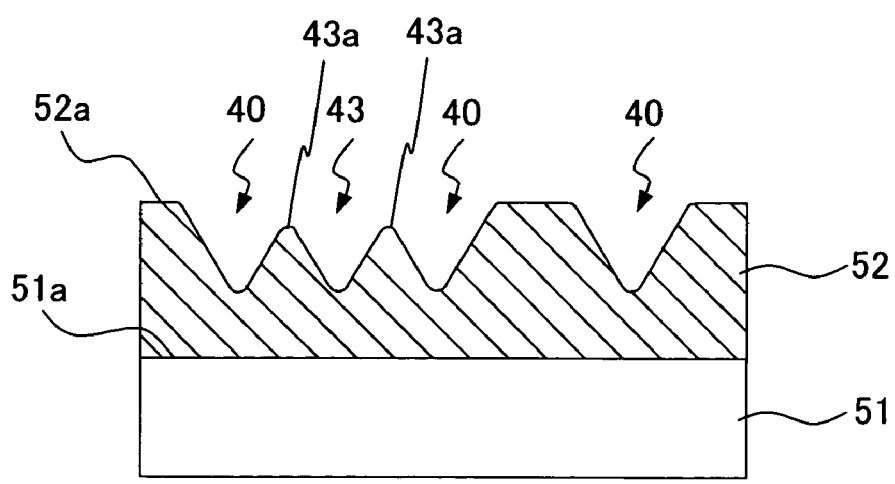
FIG. 5B shows a sectional view taken along a line 5B—5B shown in FIG. 5A.

As shown in FIGS. 5A and 5B, as for the first and second groove formation areas, the groove formation section 40 and the second land prepit formation section 43 were similarly formed on the glass master disk 50. Each of the groove formation section 40 and the second land prepit formation section 43 is formed so that the cross section is V-shaped and groove-shaped. In this arrangement, the land portion 43a of the photoresist 52, which is disposed adjacently to the second land prepit formation section 43, is affected by the totalized exposure intensity of the exposure intensity for the second land prepit formation section 43 and the exposure intensity for the groove formation section 40, which is developed to some extent, and which is formed in a state of being slightly depressed from the land portion surface 52a of the photoresist 52 at which the second land prepit formation section 43 is not provided.

Figure 7A:
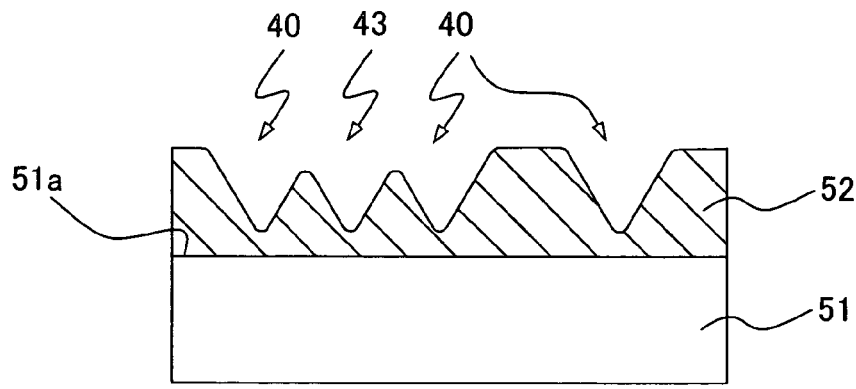
FIGS. 7A to 7D illustrate a process for manufacturing the glass master disk including an area in which no in-groove pit is formed in the third embodiment.
Figure 7B:
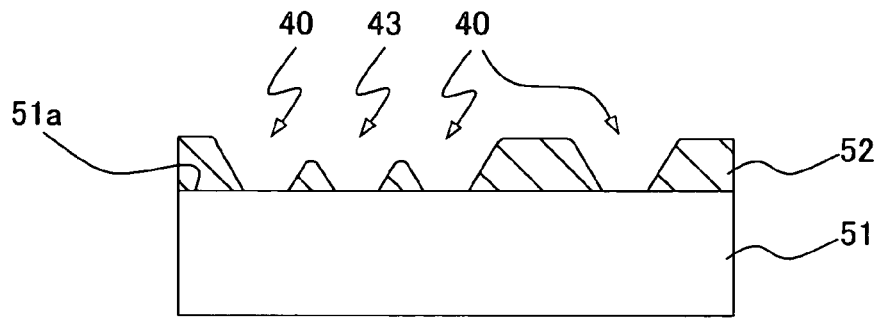
Figure 7C:
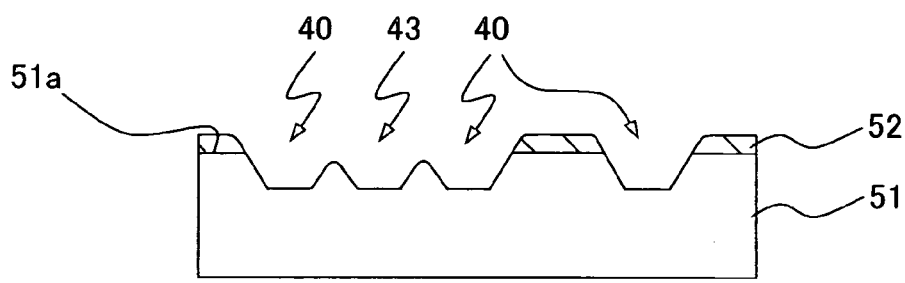
Figure 7D:
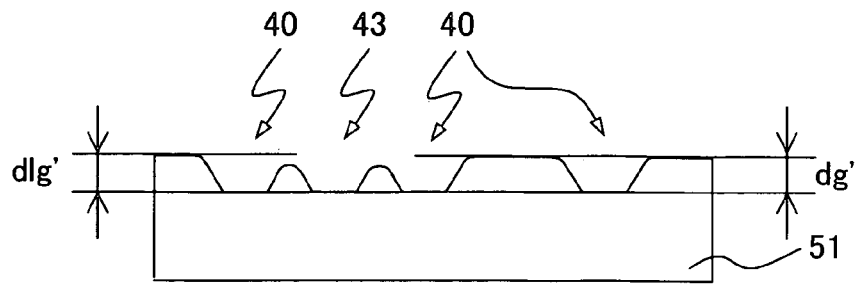

Subsequently, as shown in FIGS. 7A to 7D, a similar treatment as shown in FIGS. 29A to 29D was performed. As shown in FIG. 7A, an unillustrated RIE apparatus was used to perform the etching in a $C_2F_6$ gas atmosphere. In this procedure, the glass surface is not exposed, and hence it is not subjected to the etching. Subsequently, as shown in FIG. 7B, the photoresist 52 was eroded or scraped by a predetermined thickness by using an unillustrated resist ashing apparatus based on $O_2$. Accordingly, the glass master disk surface 51a was exposed at the groove formation section 40 and the land prepit formation section 43. Further, as shown in FIG. 7C, RIE was performed again in a $C_2F_6$ gas atmosphere for the formation surface of the photoresist 52 of the glass master disk 51. Accordingly, the groove formation section 40 was etched until arrival at a depth of 170 nm from the glass master disk surface 51a (dg'=170 nm). The second land prepit formation section 43 is undergoes the start of the etching on the way of the process of the $C_2F_6$ treatment, because the photoresist of the side wall is thinner than that of other portions. The second land prepit formation section 43 has the same bottom surface as that of the groove formation section 40. Therefore, the side wall height dlg' of the second land prepit formation section 43 is formed to be a height of 90 nm on the basis of the bottom surface of the groove formation section 40. Subsequently, as shown in FIG. 7D, the resist ashing apparatus (not shown) was used again to remove the photoresist 52 from the glass master disk 51. Accordingly, the glass master disk 51, which had the desired pattern formed on the surface, was obtained.

Figure 13B:
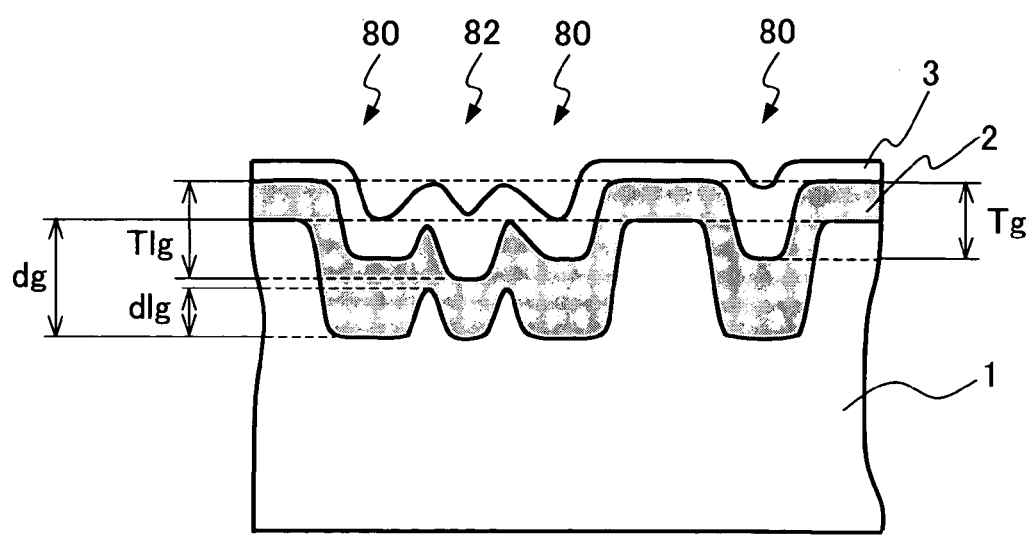
FIG. 13B shows a schematic sectional view illustrating a state in which the recording layer and the reflective layer are formed on the substrate, in addition to a sectional view taken across FIG. 13A.

The master disk thus obtained was used to manufacture the substrate by using the injection molding method in the same manner as in the first embodiment. Subsequently, as shown in FIG. 10B and FIG. 13B, the recording layer 2 and the reflective layer 3 were formed in the same manner as in the first embodiment. A dummy substrate was adhered to the obtained substrate by the aid of a photocurable resin to obtain the optical information-recording medium.

The maximum depths of the in-groove pit, the groove, and the land prepit in the in-groove pit area 73 were measured for the optical information-recording medium obtain as described above by using a scanning probe microscope produced by Digital Instruments. As shown in FIG. 10B, the side wall height dip of the first land prepit 82 was 165 nm which is measured from the bottom surface of the groove, since the first land prepit 82 has the same bottom surface as that of the groove. Further, the depth dp of the in-groove pit 84 was 260 nm which is measured from the surface of the land 81 of the substrate. The recording layer recess depths of the in-groove pit, the groove, and the first land prepit in the in-groove pit area 73 were measured by using a scanning probe microscope produced by Digital Instruments. The recording layer recess depth herein refers to the maximum recess amount of the recording layer 2 on the basis of the reference of (or measured from) the surface 2a of the recording layer 2 formed on the land 81. The recording layer recess depth Tg of the groove was 100 nm. The recording layer recess depth Tp of the in-groove pit was 170 nm. The recording layer recess depth Tlp of the first land prepit was 90 nm.

The depths of the groove and the second land prepit formed in the groove formation section were measured by using a scanning probe microscope produced by Digital Instruments. As for the height of the side wall of the second land prepit, the land surface was eroded. Therefore, as shown in FIG. 13B, when the side wall height dlg of the second land prepit was measured on the basis of the reference plane of the bottom surface of the groove, it was 90 nm. The groove depth (height) dg was 170 nm. The recording layer recess depths of the groove and the second land prepit in the groove formation area were measured by using a scanning probe microscope produced by Digital Instruments. The recording layer recess depth was defined in the same manner as described above. The recording layer recess depth Tg of the groove was 100 nm in the same manner as described above. The recording layer recess depth Tlg of the second land prepit was 110 nm.

A recording signal recorded in the in-groove pit area was reproduced on the optical information-recording medium obtained in the embodiment described above by using an optical pickup with a laser beam having a wavelength of 650 nm and a lens having a numerical aperture of 0.6. The detection and the reproduction of the signal were successfully performed in a stable manner. In this procedure, the signal modulation factor of the reproduced signal was 61%, and the jitter was 7.2%. Satisfactory results were successfully obtained in any case. As shown in FIG. 11A, the recording signal of the land prepit was successfully detected in a stable manner as well. Accordingly, the aperture ratio also satisfied the requested value. Further, the error rate sufficiently satisfied 5% as specified in the standard.

The reproduction error was also satisfactory in the groove formation area for performing the recording and the reproduction. The standard was successfully satisfied in all of the viewpoints.

Relationship between Side Wall Height of Land Prepit and Groove Depth

1) Groove without In-groove Pit

Figure 12A:
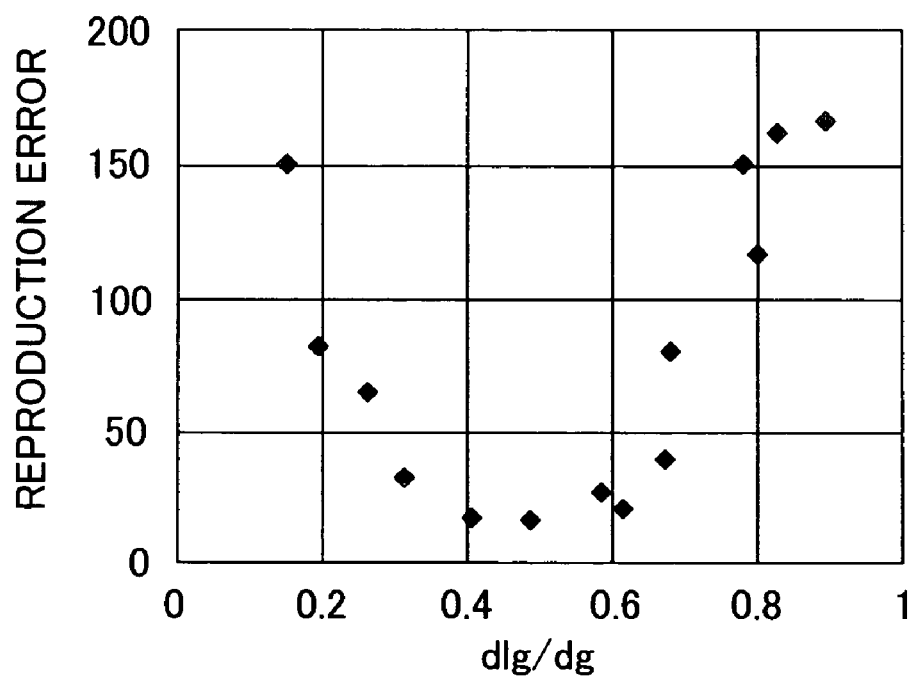
FIG. 12A shows a graph illustrating a relationship between the ratio of dlg/dg and the number of reproduction errors of the information-recording medium manufactured in the third embodiment.

Various substrates, which had different ratios dlg/dg between the groove depth (height from the groove bottom surface to the land surface) dg and the height dlg of the side wall of the land prepit, were manufactured by changing the exposure intensity of the laser beam, especially the totalized exposure amount of the laser beam for performing the exposure for the groove having no in-groove pit and the laser beam for performing the exposure for the land prepit on the land disposed adjacently to the groove when the glass master disks were subjected to the exposure. Optical information-recording media were manufactured therewith respectively in the same manner as in the embodiment described above. The recording signal was reproduced on each of the optical information-recording media to make comparison for the number of generated reproduction errors. An obtained result is shown in FIG. 12A. It is appreciated that the number of reproduction errors is suddenly increased if the condition of $0.3 \leq dlg/dg \leq 0.7$, especially of $0.3 \leq dlg/dg \leq 0.65$ is not satisfied.

2) Groove with In-groove Pit

Figure 12B:
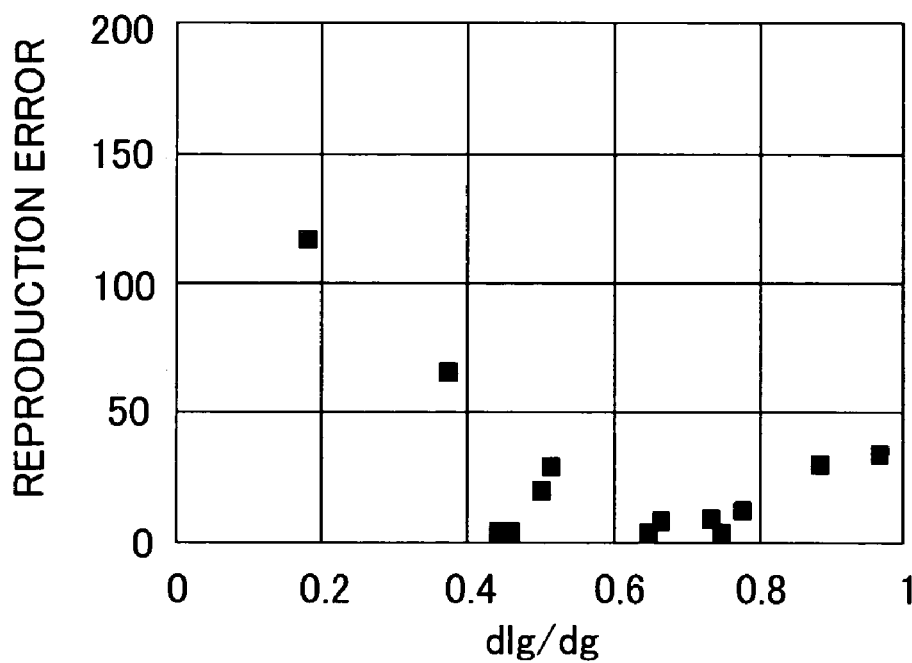
FIG. 12B shows a graph illustrating a relationship between the ratio of dlp/dg and the number of reproduction errors of the information-recording medium manufactured in the third embodiment.

Various substrates, which had different ratios dlp/dg between the groove depth (height from the groove bottom surface to the land surface) dg and the height dlp of the side wall of the land prepit, were manufactured by changing the exposure intensity of the laser beam, especially the totalized exposure amount of the laser beam for performing the exposure for the in-groove pit-equipped groove and the laser beam for performing the exposure for the land prepit on the land disposed adjacently to the groove when the glass master disks were subjected to the exposure. Optical information-recording media were manufactured therewith respectively in the same manner as in the embodiment described above. The recording signal was reproduced on each of the optical information-recording media to make comparison for the number of generated reproduction errors. An obtained result is shown in FIG. 12B. According to FIG. 12B, it is appreciated that the reproduction errors are suddenly increased if dlp/dg is less than 0.4. Therefore, it is desirable that the substrate is formed so that $0.4 \leq dlp/dg < 1$ is satisfied.

Fourth Embodiment

Figure 21A:
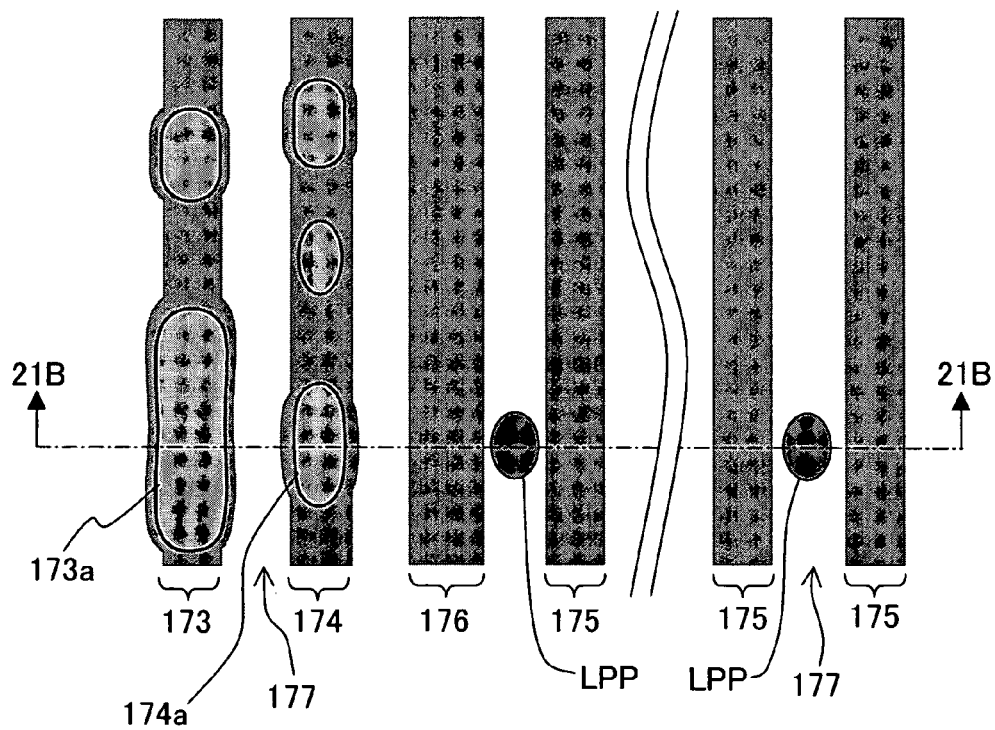
FIG. 21A shows a schematic top view illustrating a part of an optical information-recording medium having in-groove pits of the fourth embodiment.
Figure 21B:
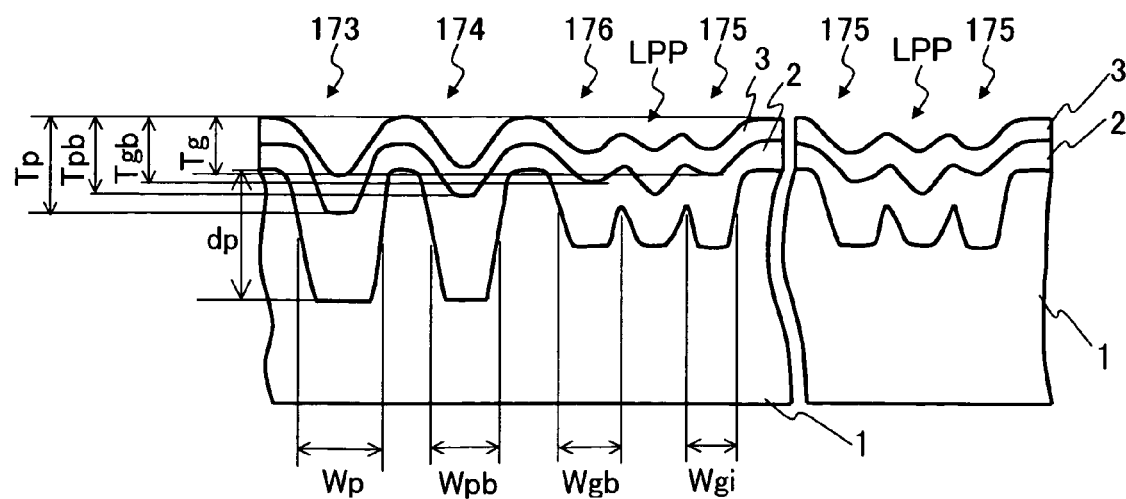
FIG. 21B shows a sectional view taken along a line 21B—21B shown in FIG. 21A.

A fourth embodiment of the present invention will be explained with reference to figures. As shown in FIGS. 21A and 21B, an optical information-recording medium of this embodiment was constructed in the same manner as in the first embodiment except that land prepits LPP were formed at predetermined intervals in the track direction on the land portion of a substrate 1, grooves except for those in the boundary groove areas 176 were formed so that the grooves were continuously deepened and widened in the direction from the inner circumference (inner side) to the outer circumference (outer side) of the substrate, and the land prepits LPP were formed so that the land prepits LPP were continuously deepened and widened in the direction from the inner circumference to the outer circumference of the substrate. The land prepits LPP are used to previously record, for example, position information of the medium on the optical information-recording medium. An explanation will be made below about methods for manufacturing a master disk and a stamper used to manufacture the substrate, and the optical information-recording medium.

Figure 23:
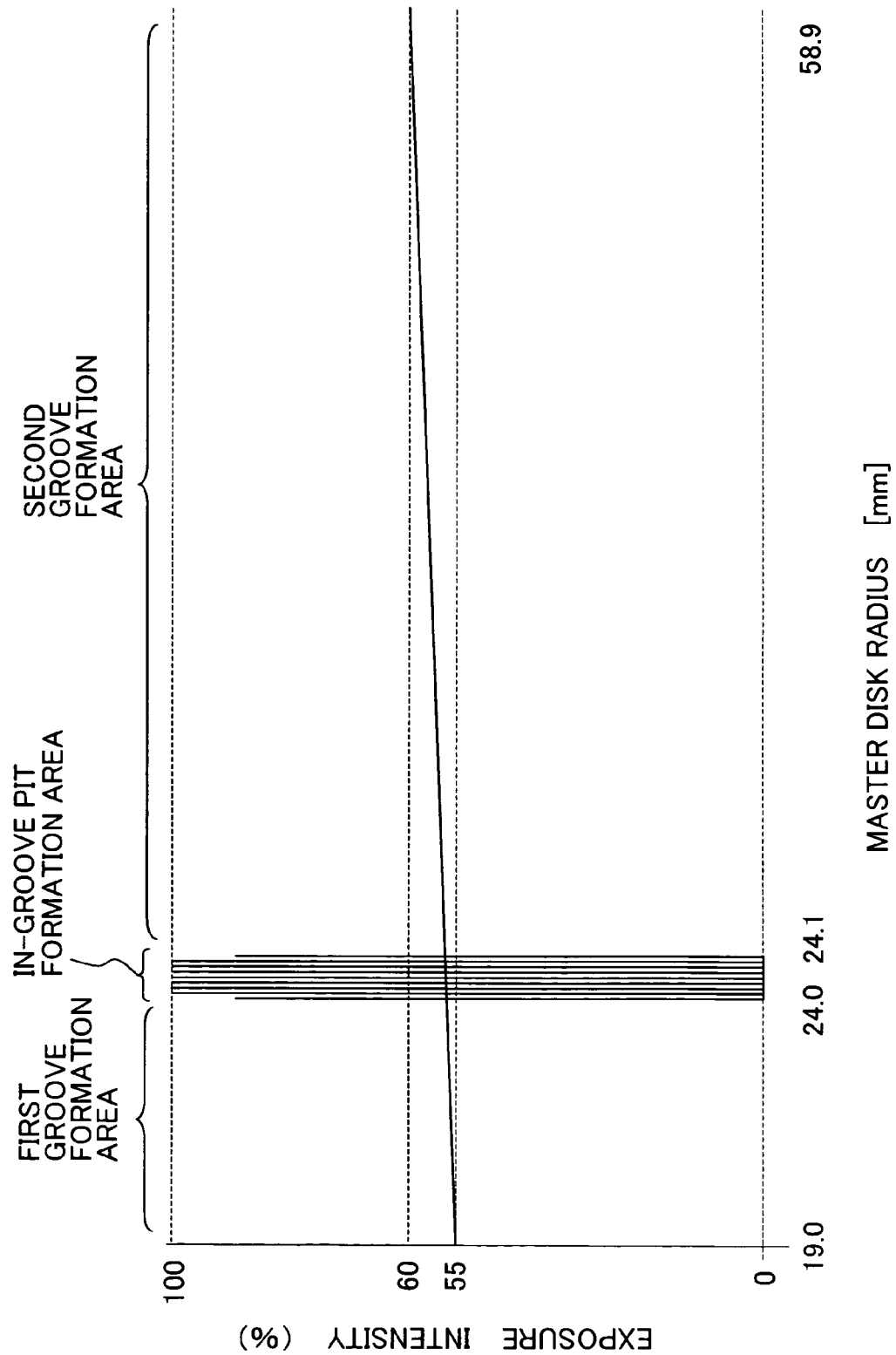
FIG. 23 shows the time-dependent change of the exposure intensity over the entire glass master disk, of the laser beam to be radiated onto the glass master disk in the fourth embodiment.

FIG. 22 shows the change of the exposure intensity of the laser beam in the vicinity of the in-groove pit formation area of the glass master disk. FIG. 23 shows the change of the exposure intensity of the laser beam over the entire glass master disk. In this embodiment, as shown in FIG. 22, the four levels, i.e., the level 1, the level 2, the level 3, and the level 4 of the exposure intensity used in the first embodiment were used for the exposure intensity of the laser beam. Further, as shown in FIG. 23, the exposure intensity at the level 1, i.e., at the groove level was continuously changed as the laser beam is moved from the inner circumference to the outer circumference of the glass master disk to perform the exposure for the master disk. In this embodiment, the following ratios of the respective levels were adopted. That is, the level 2 was set to 60% and the level 3 was set to 90% provided that the level 4 was 100%. As shown in FIG. 23, the level 1 was continuously changed so that the ratio was 55% at the exposure start position of the glass master disk (position of a radius of 19.0 mm from the center of the glass master disk) and the ratio was 60% at the exposure end position (position of a radius of 58.9 mm from the center of the glass master disk). When the exposure intensity of the groove level is changed so that the exposure intensity is continuously intensified as described above, a pattern corresponding to the groove can be formed on the glass master disk so that the width of the pattern corresponding to the groove is continuously widened in the direction from the inner side to the outer side of the glass master disk.

Land prepits are formed on the lands between the grooves in the entire region having radiuses of 19 mm to 58.9 mm as shown in FIG. 14. The intensity level of the laser beam was at a first level (hereinafter referred to as "first LPP level") for the portion (hereinafter referred to as "first land prepit formation portion") corresponding to the land prepits formed in the in-groove pit area having radiuses of 24.0 mm to 24.1 mm. The intensity level of the laser beam was at a second land prepit level (hereinafter referred to as "second LPP level") for the portion (hereinafter referred to as "second land prepit formation portion") corresponding to the land prepits in the first and second groove formation areas having radiuses of 19 mm to 24.0 mm and radiuses of 24.1 mm to 58.9 mm. Thus, the two levels were established. The signal output of the first LPP level was 90% provided that the signal output of the second LPP level was 100%.

Further, with respect to the second LPP level, the exposure intensity was changed so that the intensity was continuously intensified as the laser beam is moved from the inner circumference to the outer circumference of the disk in the same ratio as that of the intensity level 1 for the grooves.

As shown in FIG. 22, the exposure intensity was set to the level 1 for the first and second groove formation areas respectively. In the in-groove pit formation area, the exposure intensity was set to the level 4 for the in-groove pit formation portion, and the exposure intensity was set to the level 1 for the groove portion other than the above. The exposure intensity was set to the level 2 for the groove formation portions in the boundary groove formation areas. In the boundary pit formation areas, the exposure intensity was set to the level 3 for the in-groove pit formation portions, and the exposure intensity was set to the level 1 for the groove portions other than the above. Also in this embodiment, the control was made as follows to perform the exposure for the master disk in the same manner as in the third embodiment. That is, when the exposure intensity was changed during the exposure, the period, in which the exposure intensity of the laser beam was temporarily at the 0 level, was provided every time when the exposure intensity was switched. Further, the exposure intensity was temporarily lowered (to the level A) for the respective in-groove pit formation portions having the predetermined pit lengths in the in-groove pit formation area. In this embodiment, the ratio of the exposure intensity level A was 75%.

Subsequently, the glass master disk, on which the photoresist had been photosensitized, was subjected to the development treatment in the same manner as in the first embodiment. The glass master disk was subjected to the etching by using the RIE apparatus and the ashing apparatus in accordance with the pattern of the remaining photoresist. Accordingly, the glass master disk (not shown), on which a desired concave/convex pattern was formed on the surface, was obtained. In this embodiment, the RIE apparatus was controlled as follows in order to form the groove so that the depth was uniform in the track direction and the depth was continuously deepened in the direction from the inner circumference to the outer circumference of the glass master disk.

Method for Controlling RIE Apparatus

Figure 19:
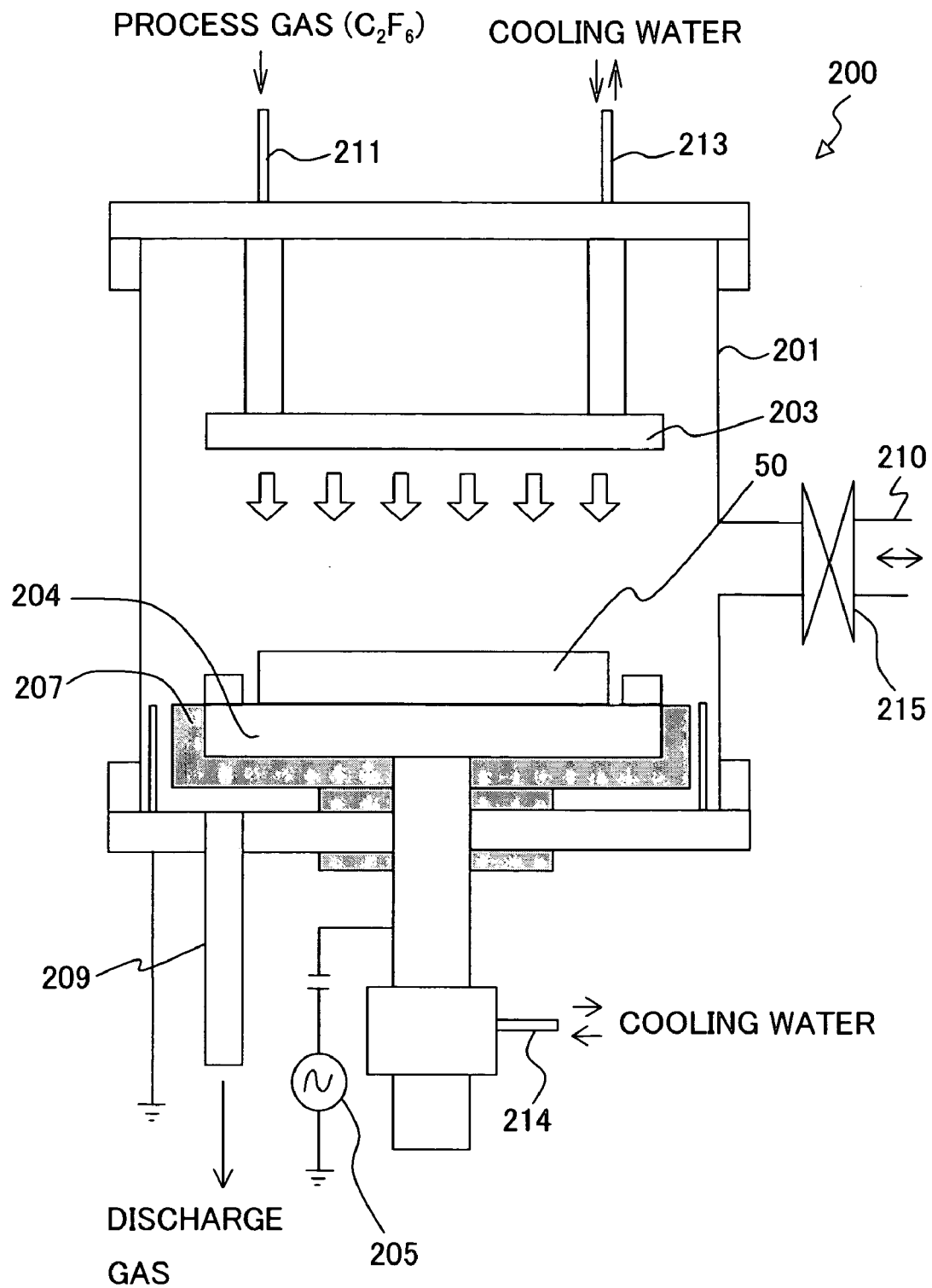
FIG. 19 shows a schematic view illustrating an RIE apparatus used in the embodiment.

FIG. 19 schematically shows the RIE apparatus. The RIE apparatus 200 principally comprises a closable chamber 201, an anode 203, a cathode 204, an RF power source 205, an insulator section 207, discharge tubes 209, 210, a gas supply tube 211, and cooling water supply tubes 213, 214. The anode 203 is installed at an upper position in the chamber 201 together with the gas supply tube 211 and the cooling water supply tube 213. The cathode 204 is installed at a lower position in the chamber 201 together with the intervening insulator section 207. The master disk, which is the etching objective, is placed on the upper surface of the cathode 204. The discharge tube 209 is provided through the lower surface of the chamber 201 so that the discharge tube 209 is communicated with the interior of the chamber 201. The discharge tube 210 is provided through the side wall of the chamber 201 so that the discharge tube 210 is communicated with the interior of the chamber 201. A gate valve 215, which is provided at an intermediate position of the discharge tube 210, makes it possible to regulate the pressure in the chamber 201.

At first, a predetermined amount of process gas ($C_2F_6$) is supplied into the chamber 201 via the gas supply tube 211 from an unillustrated gas supply unit installed on the side of the anode 203 of the RIE apparatus 200. During this operation, any excessive process gas is discharged through the discharge tube 209 so that the pressure in the chamber 201 is always constant. When the electric power is applied to the cathode 204 with the RF power source 205 in a state in which the interior of the chamber 201 is filled with the process gas, then the interior of the chamber 201 is in a plasma state, and the glass master disk 50, which is formed with the photoresist layer having the surface subjected to the patterning, is etched.

In general, in RIE, it is known that the faster the flow of the gas in the chamber is, the more increased the etching rate is. As a result of investigations performed by the present inventors while variously changing the conditions of the gas flow rate, the pressure, and the applied electric power in RIE, it has been revealed that the pressure in the chamber is especially greatly relevant in order to generate the difference between the groove depth formed on the inner side and the groove depth formed on the outer side of the master disk. As the pressure in the chamber is set to be high, the difference appears between the outer side and the inner side in relation to the gas flow rate flowing in the chamber of the RIE apparatus. Accordingly, when the position is nearer to the center in the chamber, the gas flow rate is decreased, i.e., the flow of the gas is slow. When the position is nearer to the inner wall of the chamber, the gas flow rate is increased, i.e., the flow of the gas is fast. Therefore, the etching rate is increased at positions nearer to the outer side of the glass master disk. Thus, the groove is formed, which is continuously deepened in the direction from the inner side to the outer side of the glass master disk.

In this embodiment, the gas flow rate and the applied electric power of the RIE apparatus were fixed, and only the pressure was variously changed from the reference of the conventional pressure (condition 1) to twice the conventional pressure (condition 2), four times the conventional pressure (condition 3), eight times the conventional pressure (condition 4), and sixteen times the conventional pressure (condition 5) to etch the glass master disk so that the comparison was made about the difference between the inner side and the outer side in relation to the depth of the groove formed on the glass master disk. An obtained result is shown in Table 1. Table 1 also shows, in combination, the stability of the plasma under the respective conditions. The stability of the plasma is based on the investigation about the presence or absence of, for example, the flicker and the electric discharge of the plasma during the etching. In Table 1, the symbol "+" indicates the level of no problem. The symbol "−" indicates the level at which the stability of the electric discharge is deficient and it is considered to be difficult that the master disk is processed in a reproducible manner. The symbol "±" indicates the intermediate level therebetween. According to the result shown in Table 1, it is appreciated that the difference in groove depth between the inner side and the outer side of the master disk is increased as the pressure in the chamber is set to be high, but the stability of the plasma in the chamber is deteriorated together therewith. In order to obtain a certain amount of the difference in groove depth while maintaining the stability of the plasma, it is preferable that the interior of the chamber is set to have the pressure of the condition 3, i.e., four times the conventional pressure. Accordingly, it is possible to obtaine a difference in groove depth of about 10 nm between the inner side and the outer side.

TABLE 1

| Pressure | Condition 1 (conventional) | Condition 2 | Condition 3 | Condition 4 | Condition 5 |
|---|---|---|---|---|---|
| Difference in groove depth [nm] | 1.0 | 7.5 | 9.9 | 11.6 | 20.7 |
| Stability of plasma | + | + | + | ± | − |

In this embodiment, the boundary groove formation section was subjected to the etching until arrival at a depth of 60 nm from the glass master disk surface, and the in-groove pit formation section and the boundary pit formation section were subjected to the etching until arrival at a depth of 250 nm from the glass master disk surface. The groove formation sections were subjected to the etching until arrival at a depth of 160 nm from the glass master disk surface at the inner circumferential portion (radius: 23.0 mm) of the glass master disk and at a depth of 170 nm from the glass master disk surface at the outer circumferential portion (radius: 58.7 mm) of the glass master disk. The land prepit formation portions were subjected to the etching until arrival at a depth of 160 nm from the glass master disk surface at the inner circumferential portion of the glass master disk and at a depth of 170 nm from the glass master disk surface at the outer circumferential portion of the glass master disk so that the groove depths were the same as those of the groove formation sections adjacent to the respective land prepit formation portions.

On this condition, the half depth value groove width of the groove formation section was 310 nm at the inner circumferential portion (radius: 23.0 mm) of the glass master disk and 330 nm at the outer circumferential portion (radius: 58.7 mm) of the glass master disk. The half depth value groove width of the boundary groove formation section was 330 mm, which was formed to be wide as compared with the width of the adjoining groove formation section. The width of the land prepit formation portion was 170 nm at the inner circumferential portion of the glass master disk and 200 nm at the outer circumferential portion of the glass master disk. On this condition, the length in the track direction (pit length) of the land prepit formation portion at the inner circumferential portion was 170 nm, and the length in the track direction (pit length) of the land prepit formation portion at the outer circumferential portion was 200 nm.

The substrate was manufactured with the master disk obtained as described above by using the injection molding method in the same manner as in the first embodiment. Subsequently, as shown in FIG. 21B, a recording layer 2 and a reflective layer 3 were formed in the same manner as in the first embodiment. The dummy substrate was stuck to the obtained substrate 1 by the aid of the photocurable resin, and thus the optical information-recording medium was obtained.

The maximum depths from the substrate surface (land surface) of the in-groove pit portion in the in-groove pit area, the boundary pit portion in the boundary pit area, and the groove portion in the boundary groove area of the optical information-recording medium, the maximum depths from the substrate surface of the groove portions at the inner circumferential portion (radius: 23.0 mm) and the outer circumferential portion (radius: 55.0 mm) in the groove area, and the maximum depths from the substrate surface of the land prepits at the inner circumferential portion (radius: 23.0 mm) and the outer circumferential portion (radius: 55.0 mm) were measured by using AFM produced by Digital Instruments. The maximum depth $dgi$ of the inner circumferential groove portion was 155 nm. The maximum depth $dgo$ of the outer circumferential groove portion was 165 nm. The ratio $dgo/dgi = 1.06$ is established between the maximum depth $dgi$ and the maximum depth $dgo$. It is appreciated that the condition of $1.00 < dgo/dgi \leq 1.10$ is satisfied. The maximum depth $dgb$ of the boundary groove portion was 155 nm. The maximum depth $dpb$ of the boundary pit portion was 245 nm. The maximum depth $dp$ of the in-groove pit portion was 245 nm. It is desirable that the maximum depth $dg$ ($dgi \leq dg \leq dgo$) of the groove portion and the maximum depth $dp$ of the in-groove pit portion satisfy the condition of $1.4 \leq dp/dg \leq 1.7$ in order to obtain the satisfactory recording and reproduction signal characteristics such as those concerning the degree of signal modulation and the jitter. The height $dlgi$ of the inner circumferential land prepit from the bottom surface of the groove was 90 nm, and the height $dlgo$ of the outer circumferential land prepit from the bottom surface of the groove was 100 nm.

The half value width $Wp$ of the in-groove pit portion in the in-groove pit area, the half value width $Wpb$ of the boundary pit portion in the boundary pit area, the half value width $Wgb$ of the groove portion in the boundary groove area, the half value widths $Wgi$, $Wgo$ of the groove portions at the inner circumferential portion and the outer circumferential portion in the groove area, and the bottom widths Wlpi, Wlpo of the land prepits at the inner circumferential portion (radius: 23.0 mm) and the outer circumferential portion (radius: 55.0 mm) were measured respectively on the basis of the surface of the land by using AFM produced by Digital Instruments. The half value width Wgi was 325 nm, the half value width Wgo was 345 nm, the half value width Wgb was 345 nm, the half value width Wpb was 350 nm, and the half value width Wp was 400 nm. Accordingly, it is appreciated that the relationship of $Wgi<Wgo \leq Wgb \leq Wpb <Wp$ holds. Further, it is appreciated that the ratio Wp/Wpb =1.14 is established between the half value width Wp and the half value width Wpb, and the condition of $1.05 \leq Wp/Wpb \leq 1.15$ is satisfied. Further, it is appreciated that the ratio Wgo/Wgi=1.06 is established between the half value width Wgi and the half value width Wgo, and the condition of $1.3 \leq Wgo/Wgi \leq 1.10$ is satisfied. The bottom widths Wlpi, Wlpo were 180 nm and 200 nm respectively. It is appreciated that the width of the land prepit is formed to be wider at the outer circumferential portion of the medium than at the inner circumferential portion of the medium.

As shown in FIG. 21A, in the case of the optical information-recording medium obtained in this embodiment, the width is suppressed from being widened in the radial direction of the substrate at portions in the vicinity of the middle portion in the track direction of the in-groove pit 173a in the in-groove pit area 173, as a result of the exposure performed in accordance with the exposure schedule as described above. Accordingly, the land surface, which has a sufficient areal size, is secured on the surface of the land portion 177 adjacent to the in-groove pit. Therefore, the land prepits LPP having the stable shapes can be formed on the surface of the land 177. Thus, it is possible to obtain a stable radial push-pull signal, and it is possible to reproduce the data recorded on the land prepits in a stable state.

The recording layer recess depths of the in-groove pit portion 173a in the in-groove pit area 173, the boundary pit portion 174a in the boundary pit area 174, and the groove portions in the boundary groove area 176 and the groove area 175, and the recording layer recess depth of the land prepit of the obtained optical information-recording medium were measured by using AFM produced by Digital Instruments. As shown in FIG. 21B, the recording layer recess depth Tp in the in-groove pit area 173 was 170 nm. The recording layer recess depth Tpb in the boundary pit area 174 was 135 nm. The recording layer recess depth Tgb in the boundary groove area 176 was 115 nm. Further, any one of the recording layer recess depth Tgi at the inner circumferential portion (radius: 23.0 mm) and the recording layer recess depth Tgo at the outer circumferential portion (radius: 55.0 mm) in the groove area 175 was 100 nm. It is desirable that the recording layer recess depth Tp and the recording layer recess depth Tg (=Tgi=Tgo) satisfy the condition of $1.6 \leq Tp/Tg \leq 2.0$ in order to obtain the satisfactory recording and reproduction signal characteristics such as those concerning the degree of signal modulation and the jitter. Further, any one of the recording layer recess depth Tlgi at the inner circumferential portion (radius: 23.0 mm) and the recording layer recess depth Tlgo at the outer circumferential portion (radius: 55.0 mm) of the Land prepit LPP was 100 nm.

The relationship, which holds for the recording layer recess depth Tpb of the boundary pit portion 174a, the recording layer recess depth Tp of the in-groove pit portion 173a, the recording layer recess depth Tgb in the boundary groove area 176, the recording layer recess depth Tgi of the inner circumferential portion in the groove area 175, and the recording layer recess depth Tgo of the outer circumferential portion in the groove area 175, resides in Tgi=Tgo<Tgb<Tpb<Tp, in view of the relationship among the half value widths of the grooves in the respective areas and the difference between the inner and outer circumferential portions in relation to the film thickness of the recording layer formed by the spin coat.

A recording signal recorded in the in-groove pit area was reproduced on the optical information-recording medium obtained in this embodiment by using an optical pickup with a laser beam having a wavelength of 650 nm and a lens having a numerical aperture of 0.6. The detection and the reproduction of the signal were successfully performed in a stable manner. In this operation, the degree of signal modulation of the reproduced signal was varied within a range of about 64 to 65%, and the jitter was varied within a range of about 7.8 to 7.5%. Satisfactory results were successfully obtained in any case. The reflectance variation between the inner and outer circumferential portions was less than 2% in the recording and reproducing area of the medium. The variation of the push-pull signal and the variation of the degree of modulation of the recording and reproducing signals, which would be otherwise caused by the reflectance variation, were successfully suppressed.

Fifth Embodiment

An explanation will be made with reference to FIGS. 24 to 27 and Comparative Examples 5-1 and 5-2 about optical disks of the fifth embodiment of the present invention. In order to allow the address detection used in DVD-R and DVD+R, a pattern of grooves of the disk was formed in the process as shown in the first embodiment and the following process.

EXAMPLE 5-1

DVD-R Format Disk

Figure 24:
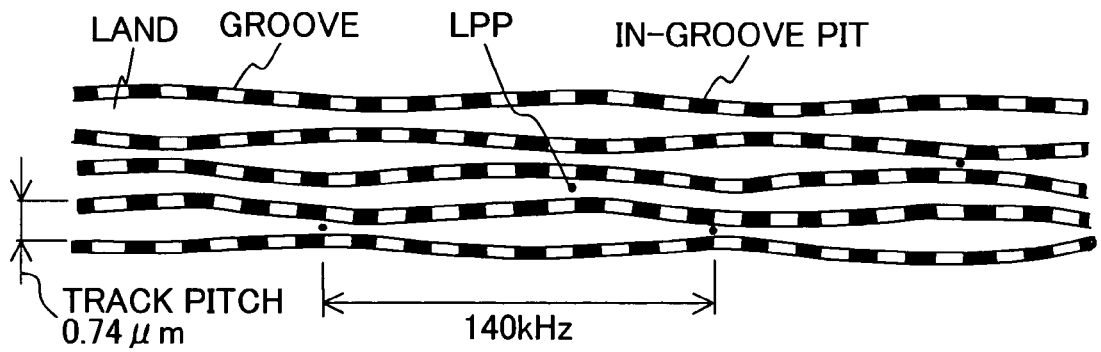
FIG. 24 shows a schematic view illustrating a groove pattern of an optical disk obtained in Example 5-1.

In DVD-R, as a means for obtaining a positional information of a disk, the land prepits LPP as described above and grooves wobbled at approximately 140 KHz (at linear velocity of 3.49 m/s of x1 speed of the DVD-R Standard), are used. The wobbled grooves were formed by inputting a signal having a frequency of 140 KHz into an AOD (Acoustic Optical Deflector) provided on an exposure apparatus for mastering process to deflect light beam for exposure of the master disk. The deflection amount W_ of the light beam for wobbling was 15 nm from peak to peak in amplitude. FIG. 24 shows a groove pattern of a molded substrate manufactured through the above mentioned exposure process. As noted from FIG. 24, in-groove pits and grooves formed in the in-groove emboss section were wobbled at 140 KHz. The molded substrate has 0.74 μm of track pitch. The molded substrate formed with this pattern was then subjected to the application of dye and the stacking in the process as described in the first embodiment. Thus, an optical disk having the DVD-R format was obtained.

EXAMPLE 5-2

DVD+R Format Disk

Figure 25:
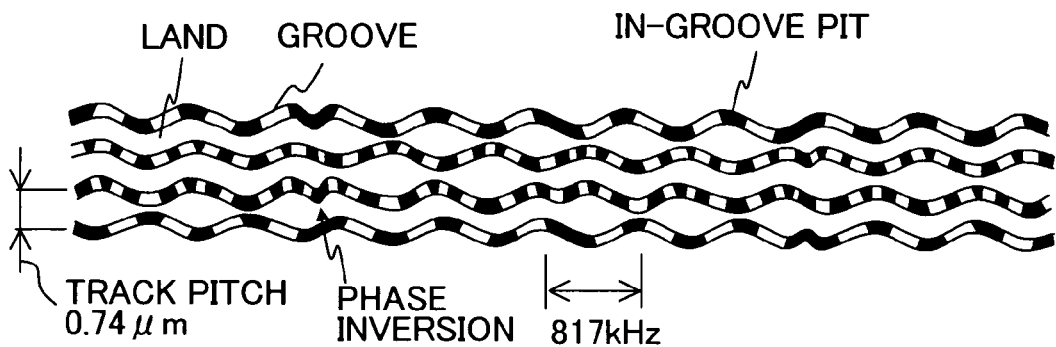
FIG. 25 shows a schematic view illustrating a groove pattern of an optical disk obtained in Example 5-2.

In DVD+R, the positional information is detected by not using the land prepits LPP but by detecting a wobble of the grooves and a phase inversion of the wobble. The frequency of the wobble is approximately 817 KHz (at linear velocity of 3.49 m/s of x1 speed of the DVD+R Standard). The wobbled grooves were formed by inputting a signal having a frequency of 817 KHz into an AOD provided on an exposure apparatus for mastering process to deflect light beam for exposure of the master disk, in the same manner as that of DVD-R. The deflection amount $W_+$ of the light beam for wobbling was 45 nm from peak to peak in amplitude. FIG. 25 shows a groove pattern of a molded substrate manufactured through the above mentioned exposure process. As noted from FIG. 25, wobbled grooves having in-groove pits wobbled at 817 KHz were formed in the in-groove emboss section. The molded substrate has 0.74 µm of track pitch. The molded substrate formed with this pattern was then subjected to the application of dye and the stacking in the process as described in the first embodiment. Thus, an optical disk having the DVD+R format was obtained.

COMPARATIVE EXAMPLE 5-1

DVD-R Format Disk

Figure 26:
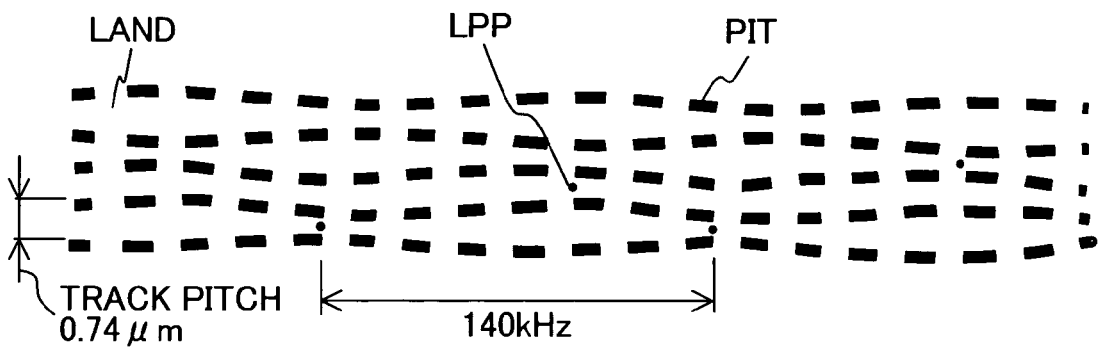
FIG. 26 shows a plane view illustrating a pit pattern of an optical disk obtained in Comparative Example 5-1.

A DVD-R substrate was manufactured in the same manner as that of Example 5-1 except for providing only pits instead for in-groove pits in the in-groove emboss section. Namely, a disk information was recorded based on pits rather than in-groove pits. The frequency of the wobble is approximately 140 KHz. The wobbled pits were formed by inputting a signal having a frequency of 140 KHz into an AOD provided on an exposure apparatus for mastering process to deflect light beam for exposure of the master disk. The deflection amount $W_-$ of the light beam for wobbling was 15 nm from peak to peak in amplitude. FIG. 26 shows a pit pattern of a molded substrate manufactured through the above mentioned exposure process. As noted from FIG. 26, pits were wobbled at 140 KHz. The molded substrate has 0.74 µm of track pitch. The molded substrate formed with this pattern was then subjected to the application of dye and the stacking in the process as described in the first embodiment. Thus, an optical disk having the DVD-R format was obtained.

COMPARATIVE EXAMPLE 5-2

DVD+R Format Disk

Figure 27:
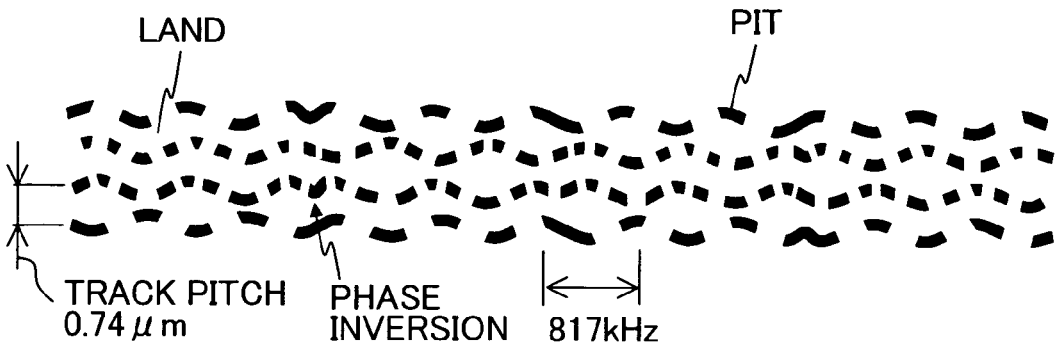
FIG. 27 shows a plane view illustrating a pit pattern of an optical disk obtained in Comparative Example 5-2.

A DVD+R substrate was manufactured in the same manner as that of Example 5-2 except for providing only pits instead for in-groove pits in the in-groove emboss section. Namely, a disk information was recorded based on pits rather than in-groove pits. The frequency of the wobble is approximately 817 KHz. The wobbled pits were formed by inputting a signal having a frequency of 817 KHz into an AOD provided on an exposure apparatus for mastering process to deflect light beam for exposure of the master disk. The deflection amount $W_+$ of the light beam for wobbling was 45 nm from peak to peak in amplitude. FIG. 27 shows a pit pattern of a molded substrate manufactured through the above mentioned exposure process. As noted from FIG. 27, pits were wobbled at 817 KHz. The molded substrate has 0.74 µm of track pitch. The molded substrate formed with this pattern was then subjected to the application of dye and the stacking in the process as described in the first embodiment. Thus, an optical disk having the DVD+R format was obtained.

RESULTS OF COMPARISON

The wobble signal and noise ratio (hereinafter referred to as "CN ratio") of Examples 5-1 and 5-2 and Comparative Examples 5-1 and 5-2 were measured to evaluate the effectiveness of the present invention. The measurement result is shown in Table 2. In Table 2, the CN ratio is indicated in dB. The CN ratio prescribed in the DVD-R standard is not less than 31 dB when data is recorded. The CN ratio prescribed in the DVD+R standard is not less than 38 dB when data is recorded.

TABLE 2

| Condition | Example 5-1 | Comparative Example 5-1 | Example 5-2 | Comparative Example 5-2 |
|---|---|---|---|---|
| CN ratio | 35 | 18 | 44 | 25 |

As appreciated from the result shown in Table 2, DVDs formed in Comparative Examples 5-1 and 5-2 in which in-groove pits were not formed in the groove can not obtain sufficient wobble CN ratios which satisfy the respective DVD standards. From the CN ratios of Examples 5-1 and 5-2, it is clear that providing the in-groove pit of the present invention is effective. In the above Examples 5-1 and 5-2, although the characteristics were evaluated at linear velocity of 3.49 m/s of x1 speed in the DVD Standards, it was found that satisfactory wobble C/N ratio could be also obtained at a greater linear velocity.

In the optical information-recording medium according to the present invention, the change in shape, which results from the length of the pit having the shape of the in-groove pit, can be suppressed, and it is possible to avoid any harmful influence on the shape of the adjoining land. In particular, even when the land prepit is disposed adjacent to a groove with or without in-groove pits, then the recording signal on the land prepits can be reliably detected, and thus the error rate is reduced. Further, the method for producing the optical information-recording medium according to the present invention is useful to produce the optical information-recording medium according to the present invention.

What is claimed is:

1. An optical information-recording medium comprising a circular substrate which is formed with a plurality of lands and grooves and a recording layer and a reflective layer which are provided on the circular substrate, wherein:
    a first pit, and a second pit which has a length in a groove direction longer than that of the first pit are formed on a bottom of the groove; and
    $1 < W_2/W_1 < 1.2$ is satisfied provided that $W_1$ represents a maximum width of the first pit in a radial direction of the substrate, and $W_2$ represents a maximum width of the second pit in the radial direction of the substrate.

2. The optical information-recording medium according to claim 1, wherein a third pit is formed on the land.

3. The optical information-recording medium according to claim 2, wherein a bottom surface of the third pit is located at the same height position as that of a bottom surface of the groove.

4. The optical information-recording medium according to claim 1, wherein the recording layer is formed of a dye.

5. The optical information-recording medium according to claim 4, wherein the dye is an azo dye.

6. The optical information-recording medium according to claim 1, wherein a groove, in which no pits are formed, is further formed on the circular substrate.

7. An optical information-recording medium comprising a circular substrate which is formed with a plurality of lands and grooves and a recording layer and a reflective layer which are provided on the circular substrate; wherein a first pit, and a second pit which has a length in a track direction longer than that of the first pit are formed on a bottom of the groove; a third pit is formed on the land between the grooves in which the first and second pits are formed; and $0.4 \leq dlp/dg < 1$ is satisfied provided that dlp represents a height of a side wall of the third pit measured from a bottom surface of the groove, and dg represents a depth of the groove.

8. The optical information-recording medium according to claim 7, wherein a plurality of grooves, in which no pits are formed, are formed on the circular substrate, a fourth pit is formed on the land defined between the grooves in which no pits are formed, and $0.3 \leq dlg/dg \leq 0.7$ is satisfied provided that dlg represents a height of a side wall of the fourth pit measured from a bottom surface of the groove in which no pits are formed, and dg represents a depth of the groove in which no pits are formed.

9. The optical information-recording medium according to claim 7, wherein the recording layer is formed of a dye.

10. The optical information-recording medium according to claim 9, wherein the dye is an azo dye.

11. A method for producing the optical information-recording medium as defined in claim 1, comprising:
exposing a photosensitive material with a pattern corresponding to at least the second pit by exposing the photosensitive material formed on a master disk while modulating an exposure intensity between a first exposure intensity and a second exposure intensity which is lower than the first exposure intensity, and exposing the photosensitive material with a pattern corresponding to the groove by exposing the photosensitive material at a third exposure intensity which is lower than the second exposure intensity;
developing the master disk after the exposure to form a pattern corresponding to the first pit, the second pit, and the groove;
forming the substrate by using the master disk on which the pattern has been formed; and
forming the recording layer and the reflective layer on the substrate.

12. The method for producing the optical information-recording medium according to claim 11, comprising exposing the photosensitive material with a pattern corresponding to the first pit by exposing the photosensitive material at the first exposure intensity.

13. The method for producing the optical information-recording medium according to claim 11, wherein the exposure intensity for the pattern corresponding to the second pit, is firstly the first exposure intensity, is changed to the second exposure intensity thereafter, and is further changed to the first exposure intensity.

14. The method for producing the optical information-recording medium according to claim 11, comprising allowing the exposure intensity to be zero before and after the exposure with the patterns corresponding to the first and second pits.

15. The method for producing the optical information-recording medium according to claim 11, comprising etching by RIE during the development.

* * * * *